US012807758B2

(12) United States Patent
Kim et al.

(10) Patent No.: US 12,807,758 B2
(45) Date of Patent: Nov. 24, 2026

(54) DOUBLE METAL CYANIDE CATALYST, PREPARATION METHOD THEREFOR, AND METHOD FOR PREPARING POLYOL

(71) Applicant: PUSAN NATIONAL UNIVERSITY INDUSTRY-UNIVERSITY COOPERATION FOUNDATION, Busan (KR)

(72) Inventors: Il Kim, Busan (KR); Seon A. Kim, Busan (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 934 days.

(21) Appl. No.: 17/758,345

(22) PCT Filed: Dec. 30, 2020

(86) PCT No.: PCT/KR2020/019436

§ 371 (c)(1),
(2) Date: Jul. 1, 2022

(87) PCT Pub. No.: WO2021/137632

PCT Pub. Date: Jul. 8, 2021

(65) Prior Publication Data

US 2023/0038470 A1 Feb. 9, 2023

(30) Foreign Application Priority Data

Jan. 3, 2020 (KR) ........................ 10-2020-0000696

(51) Int. Cl.

| | |
|---|---|
| ***C08G 65/26*** | (2006.01) |
| ***B01J 27/26*** | (2006.01) |
| ***B01J 31/02*** | (2006.01) |
| ***B01J 31/22*** | (2006.01) |
| ***B01J 31/26*** | (2006.01) |
| ***B01J 35/00*** | (2024.01) |
| ***B01J 35/30*** | (2024.01) |
| ***B01J 35/80*** | (2024.01) |
| ***B01J 37/04*** | (2006.01) |
| ***C08G 65/331*** | (2006.01) |

(52) U.S. Cl.

CPC .......... *C08G 65/2663* (2013.01); *B01J 27/26* (2013.01); *B01J 31/0274* (2013.01); *B01J 31/22* (2013.01); *B01J 31/26* (2013.01); *B01J 35/19* (2024.01); *B01J 35/30* (2024.01); *B01J 37/04* (2013.01); *C08G 65/2609* (2013.01); *C08G 65/331* (2013.01); *B01J 35/80* (2024.01); *B01J 2235/00* (2024.01); *B01J 2235/10* (2024.01); *B01J 2235/15* (2024.01)

(58) Field of Classification Search

CPC ............ C08G 65/2663; C08G 65/2609; C08G 65/331; B01J 35/30; B01J 35/80; B01J 2235/00; B01J 2235/10; B01J 2235/15; B01J 27/26; B01J 31/22; B01J 31/0274; B01J 31/26; B01J 35/19; B01J 37/04

See application file for complete search history.

(56) References Cited

U.S. PATENT DOCUMENTS

| | | | | | |
|---|---|---|---|---|---|
| 4,940,810 | A * | 7/1990 | Yokelson | C07F 7/083 | 556/438 |
| 5,482,908 | A * | 1/1996 | Le-Khac | C08G 65/2663 | 502/154 |
| 6,051,680 | A * | 4/2000 | Faraj | B01J 31/0247 | 528/412 |
| 6,348,565 | B1 | 2/2002 | Wehmeyer | | |

FOREIGN PATENT DOCUMENTS

| | | |
|---|---|---|
| KR | 20010052643 | 6/2001 |
| KR | 100355336 | 1/2003 |
| KR | 101466803 | 11/2014 |
| KR | 101908864 | 12/2018 |

OTHER PUBLICATIONS

International Search Report and Written Opinion issued in Corresponding PCT Application No. PCT/KR2020/019436, dated May 4, 2021 (English Translation provided).

Kim, Seon A. *Organosilicon Compounds as Effective Complexing Agents of Double Metal Cyanide Catalyst for the Polymerization of Epoxide*. 2020. Graduate School of Pusan National University, Master's thesis.

* cited by examiner

*Primary Examiner* — Rabon A Sergent

(74) *Attorney, Agent, or Firm* — NORTON ROSE FULBRIGHT US LLP

(57) ABSTRACT

The present invention relates to: a double-metal cyanide catalyst comprising an organosilane compound as a complexing agent; a preparation method therefor; and a method for preparing polyol. The double-metal cyanide catalyst of the present invention comprises a metal salt, a metal cyanide salt, and a complexing agent, therein the complexing agent is an organosilane compound.

10 Claims, 25 Drawing Sheets

DOUBLE METAL CYANIDE CATALYST, PREPARATION METHOD THEREFOR, AND METHOD FOR PREPARING POLYOL

CROSS-REFERENCE TO RELATED APPLICATIONS

This application a national phase under 35 U.S.C. § 371 of International Application No. PCT/KR2020/019436, filed Dec. 30, 2020, which claims priority to Korean Patent Application No. 10-2020-0000696, filed Jan. 3, 2020, with the Korean Intellectual Property Office. The contents of each of the referenced applications are incorporated into the present application by reference.

FIELD OF THE INVENTION

The present disclosure relates to a double-metal cyanide catalyst containing an organosilane compound as a complexing agent, a preparation method thereof, and a polyol preparation method.

DESCRIPTION OF RELATED ART

Double-metal cyanide or multi-metal cyanide complex is a known catalyst for epoxide polymerization, and is known to be effective in polymer polymerization by an epoxide ring-opening reaction. These catalysts provide polyols with high activity, low unsaturation, narrow molecular weight distribution, and consequently, low polydispersity.

In an example, conventionally, potassium hydroxide such as soluble basic metal hydroxide has been widely used as a catalyst for preparing polyether polyol. However, when an alkali metal hydroxide is used for polyether polyol preparation, there is a problem in that a content of a consistent polyether (so-called monol) having a terminal double bond increases, which adversely affects the polyol preparation.

To solve this problem, a double-metal cyanide catalyst with superior physical properties such as high molecular weight, high hydroxyl group, and low unsaturation compared to conventional alkali catalysts is used to prepare polyalkylene ether polyols.

Polyester polyol and polyether polyol may be prepared using the double-metal cyanide catalyst, and the prepared polyol is used for polyurethane preparation. The polyurethane may be used for construction, textile, foam, elastomer, etc.

In general, the double-metal cyanide catalyst may be prepared using a water-soluble metal salt, a water-soluble metal cyanide, a complexing agent, and a co-complexing agent. This may be expressed as Ma[M'(CN)a]bLcL'd. In this regard, each of M and M' represents a metal material, and L and L' represents complexing and co-complexing agents, respectively.

The complexing agents used in conventional double-metal cyanide catalysts may include, for example, ethylene glycol, dimethyl ether as disclosed in U.S. Pat. Nos. 4,477,589, 3,821,505, 5,158,922, or alcohol, aldehyde, ketone, ether, ester, amide, urea and the like as disclosed in U.S. Pat. No. 5,158,992.

However, as a large amount of tertiary butyl alcohol is used as the complexing agent, a catalyst price increases and environmental pollution occurs due to use of volatile organic chemicals.

SUMMARY OF THE INVENTION

One purpose of the present disclosure is to provide a double-metal cyanide catalyst containing an organosilane compound as a complexing agent and a preparation method thereof.

Another purpose of the present disclosure is to provide a polyol preparation method using the catalyst.

A double-metal cyanide catalyst according to an embodiment of the present disclosure includes a metal salt; metal cyanide; and complexing agents, wherein the complexing agent is an organosilane compound. The complexing agent in the double-metal cyanide catalyst imparts activity to the catalyst by donating electrons to metal ions of the metal salt. In this regard, when an attractive force between the complexing agent and the metal is proper, the catalyst exhibits excellent activity.

According to the present disclosure, the organosilane compound may be used as the complexing agent. Thus, the attractive force between the complexing agent and the metal is properly controlled, and thus the catalyst exhibits excellent activity.

Further, the double-metal cyanide catalyst may further include a co-complexing agent to reduce a size and crystallinity of the catalyst to increase a surface area and activity of the catalyst.

In one embodiment, the double-metal cyanide catalyst according to the present disclosure may include a compound of a following Chemical Formula 1.

$$M_{2x}[M_1(CN)_z)]_y \cdot aM_2Cl_2 \cdot bH_20 \cdot cCA \cdot dco\text{-}CA \quad \text{[Chemical formula 1]}$$

wherein in the Chemical formula 1, each of $M_1$ and $M_2$ independently represents a transition metal ion, CA represents an organosilane compound, co-CA represents a co-complexing agent, and each of a, b, c and d is a positive number.

Further, the catalyst is used for preparation of various polyols (polyether-based polyols, polycarbonate-based polyols (copolymerization of epoxides and $CO_2$), polyester-based polyols, etc.). In this regard, when the organosilane compound is a silane compound containing 1 to 3 alkoxy groups (—OR) or one hydroxyl group (—OH), the catalyst may exhibit excellent catalyst activity, in particular, polyether polyol and polycarbonate polyol synthesis.

In this regard, 'O' of the complexing agent plays the role of donating electrons to metal ions. Thus, in order that the organosilane compound be used as the complexing agent for the catalyst, self-condensation reaction should not occur in the organosilane compound, and an attractive force between organosilane compound and the metal should not be too strong or too weak.

When the organosilane compound is a silane compound containing 4 alkoxy groups (—OR), there is a problem in that the attractive force thereof with a metal active site is too strong to prevent a monomer from coordinating with the active site during a polymerization reaction, and a self-condensation reaction between the complexing agents may occur such that the complexing agent may not play the role of donating the electrons to the metal ions.

However, the catalyst according to the present disclosure contains a silane compound containing 1 to 3 alkoxy groups (—OR) as a complexing agent. Thus, the catalyst exhibits excellent synthesis efficiency in polyol (especially, polyether-based polyol and polycarbonate-based polyol) synthesis.

In this regard, when the organosilane compound is a silane compound containing three alkoxy groups (—OR), the double-metal cyanide catalyst is synthesized at 0 to 60° C. In particular, it is most preferable to carry out the synthesis at 10° C. to 40° C. or lower in which the self-condensation reaction is small. When a low synthesis temperature of 0° C. is used, the organosilane compound is injected later into the mixed solution and is dispersed therein in a state in which the temperature is rapidly lowered such that the organosilane compound may be unable to adhere to the metal ions evenly. However, when the synthesis temperature is in a range between 10° C. and 40° C., the organosilane compound may adhere to the metal ions evenly such that the catalyst has excellent catalyst activity. When the synthesis temperature above 40° C., especially above 60° C. is used, the self-condensation reaction may occur together with hydrolysis of the alkoxy group, thereby decreasing catalyst activity.

Further, most preferably, when the catalyst according to the present disclosure includes a silane compound containing one hydroxyl group (—OH) as a complexing agent, the catalyst exhibits the most excellent activity in the polyol (especially, polyether or polycarbonate-based polyol) synthesis.

In one implementation of the double-metal cyanide catalyst, the organosilane compound is represented by a following Chemical Formula 2:

[Chemical formula 2]

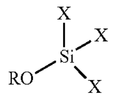

wherein in the Chemical formula 2, R represents one selected from an alkyl group having 1 to 8 carbon atoms, an acetyl group ($CH^3$—C═O), a carboxyl group (COOH) and a carbonyl group (C═O), X represents one selected from an alkyl group having 1 to 8 carbon atoms, a methyl group, an ethyl group, an isobutyl group, a phenyl group, a vinyl group, a cyclophenyl group, and a cyclohexyl group.

In one implementation of the double-metal cyanide catalyst, the organosilane compound is represented by a following Chemical Formula 3:

[Chemical formula 3]

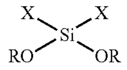

wherein in the Chemical formula 3, R represents one selected from an alkyl group having 1 to 8 carbon atoms, and hydrogen, X represents one selected from an alkyl group having 1 to 8 carbon atoms, a methyl group, an ethyl group, an isobutyl group, a phenyl group, a vinyl group, a cyclophenyl group, and a cyclohexyl group.

In one implementation of the double-metal cyanide catalyst, the organosilane compound is represented by a following Chemical Formula 4:

[Chemical formula 4]

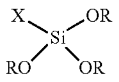

wherein in the Chemical formula 4, R represents one selected from an alkyl group having 1 to 8 carbon atoms, and hydrogen, wherein X represents one selected from an alkyl group having 1 to 8 carbon atoms, a methyl group, an ethyl group, an isobutyl group, a phenyl group, a vinyl group, a cyclophenyl group, and a cyclohexyl group.

In one implementation of the double-metal cyanide catalyst, the organosilane compound is represented by a following Chemical Formula 5:

[Chemical formula 5]

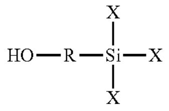

wherein in the Chemical formula 5, R represents one selected from an alkyl group having 0 or 1 to 8 carbon atoms, wherein X represents one selected from an alkyl group having 1 to 8 carbon atoms, a methyl group, an ethyl group, an isobutyl group, a phenyl group, a vinyl group, a cyclophenyl group, and a cyclohexyl group.

In one implementation of the double-metal cyanide catalyst, the metal salt is a compound of a following Chemical Formula 6:

$M(X)_n$ [Chemical formula 6]

wherein in the Chemical formula 6, M represents one selected from zinc (II), iron (II), iron (III), nickel (II), manganese (II), cobalt (II), tin (II), lead (II), molybdenum (IV), molybdenum (VI)), aluminum (III), vanadium (V), vanadium (IV), strontium (II), tungsten (IV), tungsten (VI), copper (II) and chromium (III), X represents one selected from halide, hydroxide, sulfate, carbonate, cyanide, oxalate, thiocyanate, isocyanate, isothiocyanate, carboxylate and nitrate, n is an integer from 1 to 3.

In one implementation of the double-metal cyanide catalyst, the metal cyanide is a compound of a following Chemical Formula 7:

$(Y)_aM'(CN)_b(A)_c$ [Chemical formula 7]

wherein in the Chemical formula 7, Y represents an alkali or alkaline metal,

M' represents one selected from iron (II), iron (III), cobalt (II), cobalt (III), chromium (II), chromium (III), manganese (II), manganese (III), iridium (III), nickel (II), rhodium (III), ruthenium (II), vanadium (V), and vanadium (IV), A represents one selected from halide, hydroxide, sulfate, carbonate, cyanide, oxalate, thiocyanate, isocyanate, isothiocyanate, carboxylate and nitrate, each of a and b is an integer greater than or equal to 1, and a sum of charges of a, b and c is equal to a charge of M'.

In one implementation of the double-metal cyanide catalyst, the co-complexing agent includes at least one selected from polypropylene glycol, polyethylene glycol, polytetrahydrofuran, poly(oxyethylene-block-propylene) copolymer, poly(oxyethylene-block-tetrahydrofuran) copolymer, poly (oxypropylene-block)-tetrahydrofuran) copolymer, and poly (oxyethylene-block-oxypropylene-block-oxyethylene) copolymer.

In one implementation of the double-metal cyanide catalyst, 14, wherein a weight ratio of the complexing agent and the co-complexing agent is in a range of 1 to 10:1.

Further, a method for preparing a double-metal cyanide catalyst according to another embodiment includes preparing a first solution including an organosilane-based complexing agent, metal salt and distilled water; preparing a second solution including metal cyanide and distilled water; and a first step of mixing the first solution and the second solution with each other to produce a mixed solution.

In this manner, the method may prepare the double metal cyanide catalyst using a small amount of the organosilane compound as the complexing agent, unlike a conventional preparation of the catalyst that uses an excessive amount of volatile tertiary butyl alcohol. Thus, the method according to the present disclosure may be environmentally friendly, and the number of steps of the preparation process can be reduced, and a final catalyst yield can be increased to reduce the catalyst preparation cost, and furthermore, the polyol preparation cost can also be reduced.

In particular, the existing catalysts had no or significantly low activity when no co-complexing agent was used. However, the catalyst having good activity according to the present disclosure may be synthesized within 2 hours without using the co-complexing agent.

Further, the method further comprises preparing a third solution including an organosilane-based complexing agent and a co-complexing agent, wherein the method further includes, after the first step, a second step of mixing the third solution to the mixed solution of the first step. That is, when preparing the double metal cyanide catalyst, the co-complexing agent may be additionally introduced to control the size, surface area, and crystallinity of the catalyst.

Further, the method further comprises, after the second step, a third step of mixing distilled water and an organosilane-based complexing agent with the mixed solution prepared in the second step, wherein the method further comprises, after the third step, a fourth step of the third solution to the mixed solution prepared in the third step.

In one implementation of the method, the organosilane-based complexing agent is a silane compound containing one or two alkoxy groups (—OR), or one hydroxyl group (—OH), wherein the mixing may be carried out at a temperature of 0 to 60° C., or at a temperature above 60° C.

In one implementation of the method, the organosilane-based complexing agent is a silane compound containing three alkoxy groups (—OR). The mixing is preferably carried out at a temperature of 0 to 60° C., and in particular, the mixing is most preferably carried out at a temperature of 10° C. to 40° C. or lower. When the mixing is carried out under a high temperature condition exceeding 60° C., the self-condensation reaction between the silane compounds may be accelerated, such that the silane compound may not play the role of donating the electrons.

Further, a method for preparing polyol according to still another embodiment of the present disclosure is provided, the method comprising copolymerizing polypropylene glycol and an epoxy compound under presence of the double-metal cyanide catalyst as defined above.

In this regard, the epoxy compound includes at least one selected from compounds of following chemical formulas:

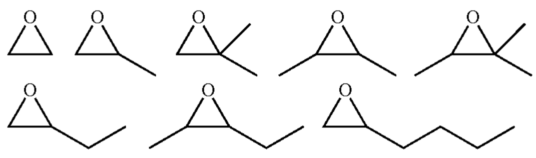

-continued

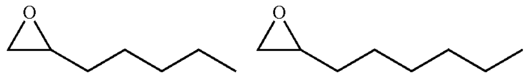

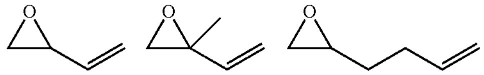

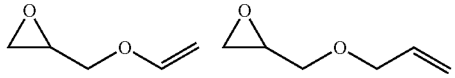

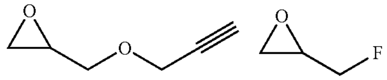

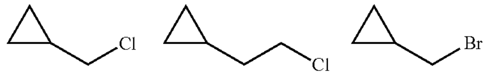

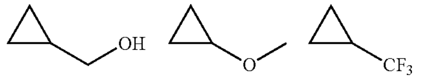

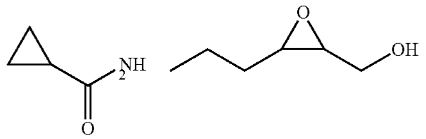

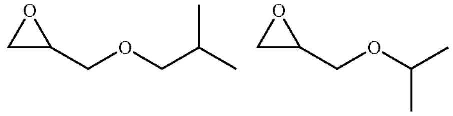

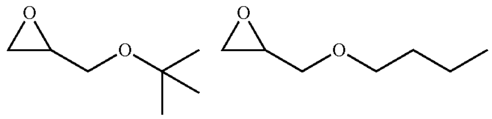

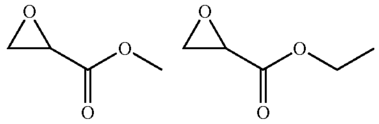

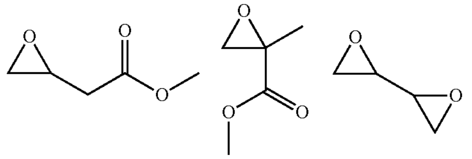

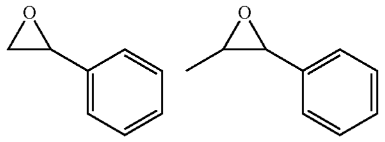

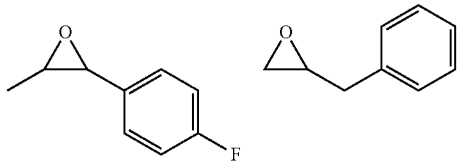

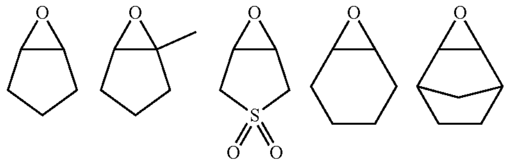

-continued

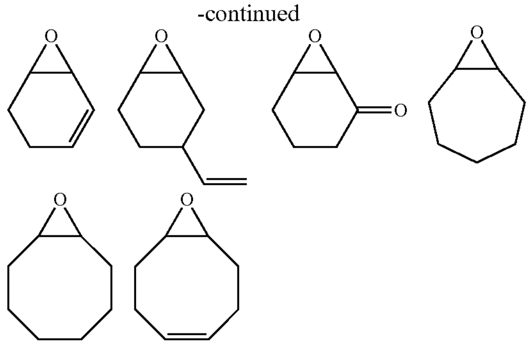

According to the present disclosure, the catalyst includes an organosilane compound containing one to three alkoxy groups (—OR), or one hydroxyl group (—OH) as a complexing agent. Thus, the catalyst may exhibit good activity due to the organosilane compound donating electrons to metal ions in the catalyst. The catalyst including the complexing agent may exhibit excellent activity in the preparation of polyols (especially, polyether-based and polycarbonate-based polyol). Thus, an induction time as a time taken until a polymerization reaction is activated in the polyol preparation may be shortened into a range of serval minutes to several tens of minutes.

Further, the method may prepare the double metal cyanide catalyst using a small amount of the organosilane compound as the complexing agent, unlike a conventional preparation of the catalyst that uses an excessive amount of volatile tertiary butyl alcohol. Thus, the method according to the present disclosure may be environmentally friendly, and the number of steps of the preparation process can be reduced, and a final catalyst yield can be increased to reduce the catalyst preparation cost, and furthermore, the polyol preparation cost can also be reduced.

Further, the method according to the present disclosure may prepare the double-metal cyanide catalyst having good activity using only the organosilane compound as a complexing agent without using the co-complexing agent.

DETAILED DESCRIPTION OF THE INVENTION

Figure 1:
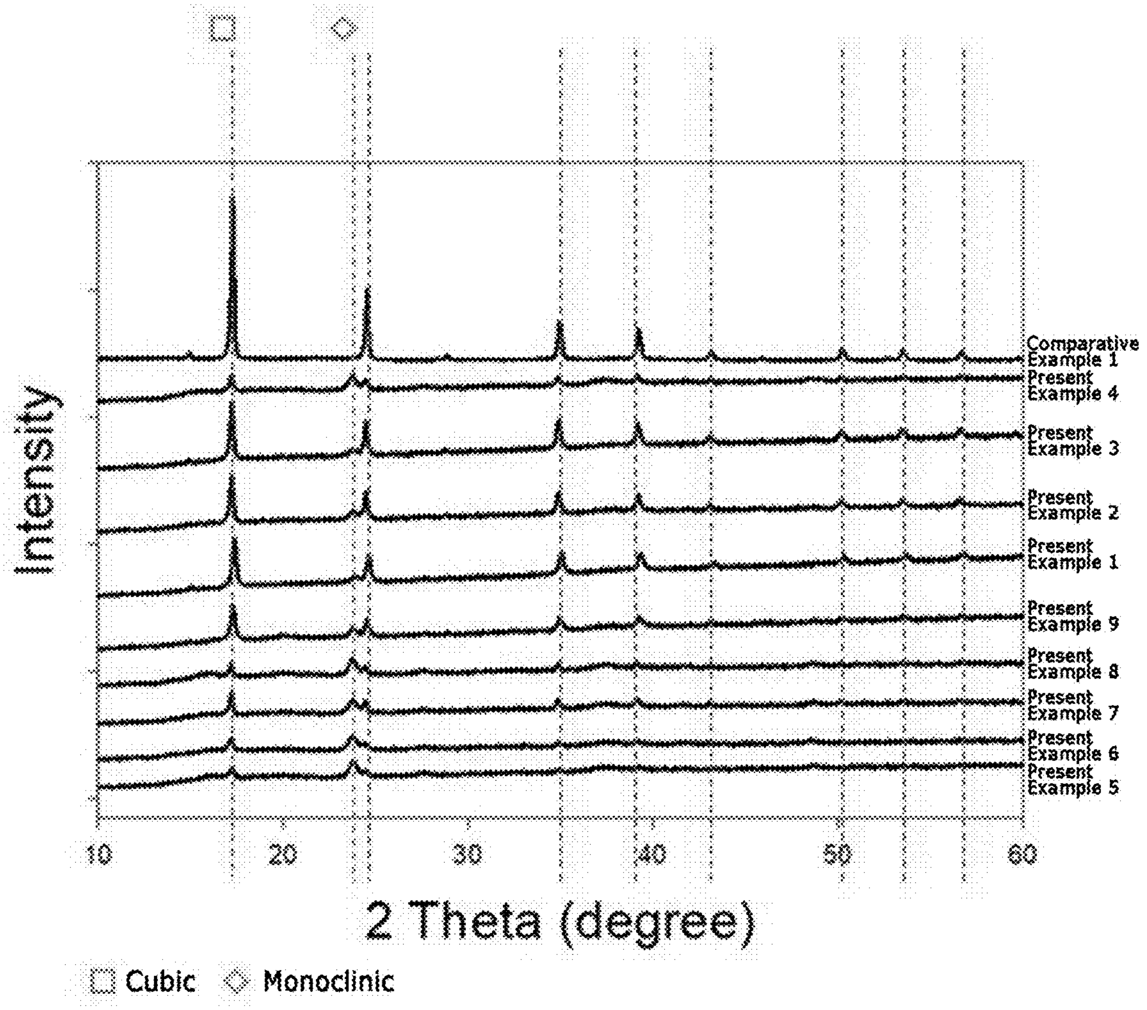
FIG. 1 shows an X-ray diffraction analysis spectrum of a catalyst according to each of Present Examples 1 to 9 and Comparative Example 1.

Hereinafter, an embodiment of the present disclosure will be described in detail with reference to the accompanying drawings. In the present disclosure, various changes may be made. The present disclosure may have various forms. Thus, specific embodiments may be illustrated in the drawings and may be described in detail herein. However, the embodiments are not intended to limit the present disclosure to a specific form. It should be understood that the present disclosure may include all changes, equivalents or substitutes included in the spirit and scope of the present disclosure. In illustrating the drawings, like reference numerals have been used for like elements.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or greater other features, integers, operations, elements, components, and/or portions thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A double-metal cyanide catalyst according to the present disclosure may include a metal salt; metal cyanide; and a complexing agent, wherein the complexing agent is preferably an organosilane compound.

The complexing agent in the double-metal cyanide catalyst imparts activity to the catalyst by donating electrons to metal ions of the metal salt. In this regard, when an attractive force between the complexing agent and the metal is proper, the catalyst exhibits excellent activity.

According to the present disclosure, the organosilane compound may be used as the complexing agent. Thus, the attractive force between the complexing agent and the metal is properly controlled, and thus the catalyst exhibits excellent activity.

Further, the double-metal cyanide catalyst may further include a co-complexing agent to reduce a size and crystallinity of the catalyst to increase a surface area and activity of the catalyst. In one embodiment, the double-metal cyanide catalyst according to the present disclosure may include a compound of a following Chemical Formula 1.

$M_{2x}[M_1(CN)_z)]_y \cdot aM_2Cl_2 \cdot bH_20 \cdot cCA \cdot dco\text{-}CA$ [Chemical formula 1]

In the Chemical formula 1, each of $M_1$ and $M_2$ independently represents a transition metal ion, CA represents an organosilane compound, co-CA represents a co-complexing agent, and each of a, b, c and d is a positive number.

The double-metal cyanide catalyst as described above may be used for preparation of polyols, particularly, polyether-based and polycarbonate-based polyols.

Specifically, the organosilane compound as the complexing agent of the catalyst is more preferably a silane compound containing 1 to 3 alkoxy groups (—OR) or one hydroxyl group (—OH).

'O' of the complexing agent plays the role of donating electrons to metal ions. Thus, in order that the organosilane compound be used as the complexing agent for the catalyst, self-condensation reaction should not occur in the organosilane compound, and an attractive force between organosilane compound and the metal should not be too strong or too weak.

However, when the organosilane compound is a silane compound containing 4 alkoxy groups (—OR), there is a problem in that the attractive force thereof with a metal active site is too strong to prevent a monomer from coordinating with the active site during a polymerization reaction, and a self-condensation reaction between the complexing agents may occur such that the complexing agent may not play the role of donating the electrons to the metal ions.

Therefore, the organosilane compound according to the present disclosure is preferably a silane compound containing one to three alkoxy groups (—OR), or one hydroxyl group (—OH). Most preferably, the organosilane compound according to the present disclosure may be a silane compound containing one hydroxyl group (—OH).

In one embodiment, the organosilane compound containing one alkoxy group (—OR) may be represented by a following Chemical Formula 2.

[Chemical formula 2]

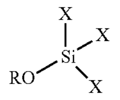

In the Chemical formula 2, R represents one selected from an acetyl group ($CH_3$—C═O), a carboxyl group (COOH), a carbonyl group (C═O), and an alkyl group having 1 to 8 carbon atoms. X may represent one selected from a methyl group, an ethyl group, an isobutyl group, a phenyl group, a vinyl group, a cyclophenyl group, a cyclohexyl group, and an alkyl group having 1 to 8 carbon atoms.

That is, the organosilane compound containing one alkoxy group (—OR) may include, for example, at least one selected from trialkyl alkoxy silanes such as trimethyl methoxysilane, trimethyl ethoxysilane, triethyl methoxysilane, triethyl ethoxysilane, 2-(trimethyl silyl)ethoxymethyl chloride, 2-trimethylsiloxypent-2-ene-4-one, isoflephenoxide thymethylsilane, ethyl(2-trimethylsilyl) acetate, and trimethylphenoxysilane, or trialkyl silyl acetates such as trimethyl silyl acetate.

In one embodiment, the organosilane compound containing two alkoxy groups (—OR) may be represented by a following Chemical Formula 3.

[Chemical formula 3]

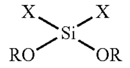

In the Chemical formula 3, R may represent one selected from an alkyl group having 1 to 8 carbon atoms, and hydrogen. X may represent one selected from a methyl group, an ethyl group, an isobutyl group, a phenyl group, a vinyl group, a cyclophenyl group, a cyclohexyl group, and an alkyl group having 1 to 8 carbon atoms.

That is, the organosilane compound containing two alkoxy groups (—OR) may include, for example, at least one selected from dialkyl dialkoxy silanes or dialkyl silanediol such as dimethyl dimethoxysilane, dimethyl diethoxy silane, diethyl dimethoxysilane, diethyl diethoxysilane, diisopropyldimethoxysilane, t-butylmethyldimethoxysilane, t-butylmethyldiethoxysilane, t-amylmethyl diethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bisethylphenyldimethoxysilane, dicyclohexyldimethoxysilane, cyclohexylmethyldimethoxysilane, cyclohexylmethyldiethoxysilane, 2-norbornanemethyldimethoxysilane), dodecyl methyldimethoxysilane, diisopropenoxydimethylsilane, bis(cyclobutyl)methyldimethoxysilane, bis(cyclopropyl)methyldimethoxysilane, bis (cyclopentyl)methyldimethoxysilane, bis(cyclohexyl)methyldimethoxysilane, bis(cycloheptyl)methyl dimethoxysilane, (cyclobutyl)methyl (cyclopropyl)methyl dimethoxysilane, (cyclopentyl)methyl (cyclopropyl)methyl dimethoxysilane, (cyclohexyl)methyl (cyclopropyl)methyl dimethoxysilane, (cycloheptyl)methyl (cyclopropyl)methyl dimethoxysilane, (cyclobutyl)methyl (cyclopentyl)methyl dimethoxysilane, (cyclobutyl)methyl (cyclohexyl) methyl dimethoxysilane, (cyclobutyl)methyl (cycloheptyl)methyl dimethoxysilane, (cyclopentyl)methyl (cyclohexyl)methyl dimethoxysilane, (cyclopentyl)methyl (cycloheptyl)methyl dimethoxysilane, (cyclohexyl)methyl (cycloheptyl)methyl dimethoxysilane, (cyclobutyl)methyl cyclobutyl dimethoxysilane, (cyclobutyl)methyl methyl dimethoxysilane, (cyclopropyl)methyl methyl dimethoxysilane, (cyclopropyl)methyl isopropyl dimethoxysilane, (cyclopropyl)methyl butyl dimethoxysilane, (cyclopropyl)methyl cyclopentyl dimethoxysilane, (cyclopropyl)methyl cyclohexyl dimethoxysilane, (cyclopropyl)methyl 2-ethylhexyl dimethoxysilane, (cyclobutyl)methyl methyl dimethoxysilane, (cyclobutyl)methyl isopropyl dimethoxysilane, (cyclobutyl)methyl butyl dimethoxysilane, (cyclobutyl)methyl cyclopentyl dimethoxysilane, (cyclobutyl)methyl cyclohexyl dimethoxysilane, (cyclobutyl)methyl 2-ethylhexyl dimethoxysilane, (cyclopentyl)methyl cyclobutyl dimethoxysilane, (cyclopentyl)methyl methyl dimethoxysilane, (cyclohexyl)methyl methyl dimethoxysilane, (cyclohexyl)methyl isopropyl dimethoxysilane, (cyclohexyl)methyl butyl dimethoxysilane, (cyclohexyl)methyl cyclopentyl dimethoxy silane, (cyclohexyl) methyl cyclohexyl dimethoxysilane, (cyclohexyl)methyl 2-ethylhexyl dimethoxysilane, (cyclopentyl)methyl methyl dimethoxysilane, (cyclopentyl)methyl isopropyl dimethoxysilane, (cyclopentyl)methyl butyl dimethoxysilane, (cyclopentyl)methyl cyclo pentyl dimethoxysilane, (cyclopentyl) methyl cyclohexyl dimethoxysilane, (cyclopentyl)methyl 2-ethylhexyl dimethoxysilane, (cycloheptyl)methyl cyclobutyl dimethoxysilane, (cycloheptyl)methyl methyl dimethoxysilane, (cycloheptyl)methyl methyl dimethoxysilane, (cycloheptyl)methyl iso propyl dimethoxysilane, (cycloheptyl)methyl butyl dimethoxysilane, (cycloheptyl) methyl cyclopentyl dimethoxysilane, (cycloheptyl)methyl cyclohexyl dimethoxysilane, bis(cyclobutyl)methyldiethoxysilane, bis(cyclopropyl)methyldiethoxysilane, bis(cyclopentyl)methyldiethoxysilane, bis(cyclohexyl)methyl diethoxysilane, bis(cycloheptyl) methyl diethoxysilane, (cyclobutyl)methyl (cyclopropyl)methyl diethoxysilane, (cyclopentyl)methyl (cyclopropyl)methyl diethoxysilane, (cyclohexyl)methyl (cyclopropyl)methyl diethoxysilane, (cycloheptyl)methyl (cyclopropyl)methyl diethoxysilane, (cyclobutyl)methyl (cyclopentyl)methyl diethoxysilane, cyclobutyl)methyl (cyclohexyl)methyl diethoxysilane, (cyclobutyl)methyl (cycloheptyl)methyl diethoxysilane, (cyclopentyl)methyl (cyclohexyl)methyl diethoxysilane, (cyclopentyl)methyl (cycloheptyl)methyl diethoxysilane, (cyclohexyl)methyl (cycloheptyl)methyl diethoxysilane, (cyclobutyl)methyl cyclobutyl diethoxysilane, (cyclobutyl) methyl methyl diethoxysilane, (cyclopropyl)methyl methyl diethoxysilane, (cyclopropyl)methyl isopropyl diethoxysilane, (cyclopropyl)methyl butyl diethoxysilane, (cyclopropyl)methyl cyclopentyl diethoxysilane, (cyclopropyl)methyl cyclohexyl diethoxysilane, (cyclopropyl)methyl 2-ethylhexyl diethoxysilane, (cyclobutyl)methyl methyl diethoxysilane, (cyclobutyl)methyl isopropyl diethoxysilane, (cyclobutyl)methyl butyl diethoxysilane, (cyclobutyl)methyl cyclo pentyl diethoxysilane, (cyclobutyl)methyl cyclohexyl diethoxysilane, (cyclobutyl)methyl 2-ethylhexyl diethoxysilane, (cyclopentyl)methyl cyclobutyl diethoxysilane, (cyclopentyl)methyl methyl diethoxysilane, (cyclohexyl)methyl methyl diethoxysilane, (cyclohexyl)methyl isopropyl diethoxysilane, (cyclohexyl)methyl butyl diethoxysilane, (cyclohexyl)methyl cyclopentyl diethoxysilane, (cyclohexyl)methyl cyclohexyl diethoxysilane, (cyclohexyl)methyl 2-ethylhexyl diethoxysilane, (cyclopentyl)methyl methyl diethoxysilane, (cyclopentyl)methyl isopropyl diethoxysilane, (cyclopentyl)methyl butyl diethoxysilane, (cyclopentyl)methyl cyclopentyl diethoxysilane, (cyclopentyl)methyl cyclohexyl diethoxysilane, (cyclopentyl)methyl 2-ethylhexyl diethoxysilane, (cycloheptyl)methyl cyclobutyl diethoxysilane, (cycloheptyl) methyl methyl diethoxysilane, (cycloheptyl)methyl methyl diethoxysilane, (cycloheptyl) methyl isopropyl diethoxysilane, (cycloheptyl)methyl butyl diethoxysilane, (cycloheptyl)methyl cyclopentyl diethoxysilane, (cycloheptyl)methyl cyclohexyl diethoxysilane, (cycloheptyl)methyl 2-ethylhexyl diethoxysilane, etc.

In one embodiment, the organosilane compound containing three alkoxy groups (—OR) may be represented by a following Chemical Formula 4.

[Chemical formula 4]

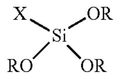

In the Chemical formula 4, R may represent one selected from an alkyl group having 1 to 8 carbon atoms, hydrogen. X may represent one selected from a methyl group, an ethyl group, an isobutyl group, a phenyl group, a vinyl group, a cyclophenyl group, a cyclohexyl group and an alkyl group having 1 to 8 carbon atoms.

That is, the organosilane compound containing three alkoxy groups (—OR) may be, for example, alkyl trialkoxy silane or 2-trimethylsilyl alcohol.

In this regard, when the organosilane compound is a silane compound containing three alkoxy groups (—OR), the double-metal cyanide catalyst is preferably synthesized at 0 to 60° C. This is because, when a catalyst is synthesized under a high temperature condition exceeding 60° C., a self-condensation reaction between the silane compounds proceeds, and thus the silane compound cannot properly play the role of the electron donation.

Further, the organosilane compound containing one hydroxyl group (—OH), which is the most preferred embodiment of the present disclosure, may be represented by a following Chemical Formula 5.

[Chemical formula 5]

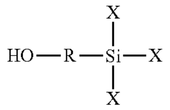

In the Chemical formula 5, R may represent one selected from an alkyl group having 0 or 1 to 8 carbon atoms. X may represent one selected from an alkyl group having 1 to 8 carbon atoms, a methyl group, an ethyl group, an isobutyl group, a phenyl group, a vinyl group, a cyclophenyl group, and a cyclohexyl group.

That is, the organosilane compound containing one hydroxyl group (—OH) may include, for example, at least one selected from trialkyl silanol such as trimethyl silanol, triethylsilanol, triphenylsilanol, tert-butyldimethylsilanol, dimethylphenylsilanol, diethyl (isopropyl)silanol, etc. or trialkylsilyl alcohol such as 2-trimethylsilyl ethanol, etc.

In one example, the metal salt included in the catalyst according to the present disclosure may be a compound of a following Chemical Formula 6.

$M(X)_n$ [Chemical formula 6]

In the Chemical formula 6, M represents one selected from zinc (II), iron (II), iron (III), nickel (II), manganese (II), cobalt (II), tin (II), lead (II), molybdenum (IV), molybdenum (VI), aluminum (III), vanadium (V), vanadium (IV), strontium (II), tungsten (IV), tungsten (VI), copper (II) and chromium (III). X represents one selected from halide, hydroxide, sulfate, carbonate, cyanide, oxalate, thiocyanate, isocyanate, isothiocyanate, carboxylate and nitrate. n is an integer from 1 to 3.

That is, the metal salt may include, for example, zinc chloride, zinc bromide, zinc acetate, zinc acetylacetonate, zinc benzoate, zinc nitrate, iron(II) bromide, cobalt(II) chloride, cobalt(II) thiocyanate, nickel(II) formate, nickel(II) nitrate, etc. However, the disclosure is not limited thereto.

In addition, the metal cyanide included in the catalyst according to the present disclosure may be a compound of a following Chemical Formula 7.

$(Y)_aM'(CN)_b(A)_c$ [Chemical formula 7]

In the Chemical formula 7, Y represents an alkali or alkaline metal. M' represents one selected from iron (II), iron (III), cobalt (II), cobalt (III), chromium (II), chromium (III), manganese (II), manganese (III), iridium (III), nickel (II), rhodium (III), ruthenium (II), vanadium (V), and vanadium (IV). A represents one selected from halide, hydroxide, sulfate, carbonate, cyanide, oxalate, thiocyanate, isocyanate, isothiocyanate, carboxylate and nitrate. Each of a and b is an integer greater than or equal to 1, and a sum of charges of a, b and c is equal to a charge of M'.

That is, the metal cyanide may include, for example, potassium hexacyanocobaltate (III), potassium hexacyanoferrite (II), potassium hexacyanoferrite (III), calcium hexacyanocobaltate (II), lithium hexa cyanoferrite (II), zinc hexacyanocobaltate (II), zinc hexacyanoferrite (II), nickel hexacyanoferrite (II), cobalt hexacyanocobaltate (III), etc. However, the present disclosure is not limited thereto.

The co-complexing agent includes one or more electron-donating '0' and may include at least one selected from polypropylene glycol, polyethylene glycol, polytetrahydrofuran, poly(oxyethylene-block-propylene) copolymer, poly (oxyethylene-block-tetra)hydrofuran) copolymer, poly(oxypropylene-block-tetrahydrofuran) copolymer and poly (oxyethylene-block-oxypropylene-block-oxyethylene) copolymer. Preferably, the co-complexing agent may be polypropylene glycol. The present disclosure is not limited thereto.

When the double-metal cyanide catalyst according to the present disclosure includes the co-complexing agent as described above, a weight ratio of the complexing agent and the co-complexing agent is preferably 1 to 10:1. The co-complexing agent itself is an oligomer or polymer. When the co-complexing agent is used in an excessive amount, the co-complexing agent entirely surrounds an active site of the catalyst, such that the catalyst may not be activated. Since the catalyst may be present in a form of a solid having viscosity instead of a fine powder, it is most preferable that the co-complexing agent be contained within the above weight ratio range.

According to the present disclosure, the organosilane compound containing 1 to 3 alkoxy groups (—OR) or one hydroxyl group (—OH) is included as the complexing agent. Thus, the organosilane compound may donate electrons to metal ions in the catalyst. As a result, the catalyst may exhibit good activity, and may exhibit excellent activity in polyol preparation and thus may be used as a catalyst for preparation of polyether-based and polycarbonate-based polyols.

In one example, a method for preparing a double-metal cyanide catalyst as another embodiment of the present disclosure includes preparing a first solution including an organosilane-based complexing agent, a metal salt, and distilled water; preparing a second solution including metal cyanide and distilled water; and a first step of mixing the first solution and the second solution with each other to produce a mixed solution.

First, the first solution including an organosilane-based complexing agent, metal salt, and distilled water, and the second solution including metal cyanide and distilled water may be prepared. In this regard, the organosilane-based complexing agent, the metal salt, and the metal cyanide may be the same materials as described above, respectively. Thus, a description thereof will be omitted.

Thereafter, the first solution and the second solution may be mixed with each other.

In this regard, when the organosilane-based complexing agent may be a silane compound containing 1 to 2 alkoxy groups (—OR) or 1 hydroxyl group (—OH). In this case, the mixing is preferably carried out at a temperature of 0 to 60° C. The present disclosure is not limited thereto.

In another example, the organosilane-based complexing agent may be a silane compound containing three alkoxy groups (—OR). In this case, the mixing is preferably performed at a temperature of 0 to 60° C. When the mixing is carried out under a high temperature condition exceeding 60° C., a self-condensation reaction between the silane compounds may occur, such that the organosilane-based complexing agent may fail to properly perform the role of donating the electrons to the metal ions.

Thereafter, a process of washing and drying thus-obtained precipitates may be carried out. Thus, the double-metal cyanide catalyst according to the present disclosure may be prepared.

In this way, the double-metal cyanide catalyst may be prepared using the organosilane compound instead of tertiary butyl alcohol as the complexing agent. Thus, the preparation process may be environmentally friendly. The number of steps of the preparation process may be reduced. Further, a final catalyst yield increases, such that a catalyst preparation cost may be reduced, and thus a polyol preparation cost may also be reduced.

In one example, the method according to the present disclosure may further include preparing a third solution including an organosilane-based complexing agent and a co-complexing agent and a second step of mixing the third solution with the mixed solution of the first and second solutions.

That is, during the preparation of the double-metal cyanide catalyst, the co-complexing agent may be additionally introduced. A size and crystallinity of the catalyst may be controlled due to the introduction of the co-complexing agent. In addition, the catalyst may exhibits good activity within 2 hours even when no co-complexing agent is used. The present disclosure becomes a motif for development of various double-metal cyanide catalysts.

Further, the method may further include, after the second step, a third step of adding distilled water and an organosilane-based complexing agent to the mixed solution prepared in the second step. The method may further include, after the third step, a fourth step of adding the third solution to the mixed solution prepared in the third step. As the third step and the fourth step are repeated one or more times, the complexing agent weakly coordinated (donating electrons to) with the metal is removed, and an amount of a complexing agent donating electrons to the metal increases due to the additionally added complexing agent, so that a catalyst having higher activity may be prepared. Therefore, among the catalysts of the present disclosure, a catalyst that has prepared using a total of three steps (Present Examples 11 and 12) has the highest activity. However, even a catalyst (Present Example 13) that has prepared using one step under the same condition has an activity which is similar to that of the catalyst that has prepared using a total of three steps. Thus, an excellent catalyst could be prepared according to the present disclosure.

Thereafter, a precipitate after each of the steps may be obtained, washed and dried to prepare a double-metal cyanide catalyst. Since the prepared catalyst has high activity in the polyol preparation. Thus, an induction time as a time taken until a polymerization reaction is activated in the polyol preparation may be shortened into a range of serval minutes to several tens of minutes.

In one example, in another embodiment of the present disclosure, a polyol preparation method including a step of copolymerizing polypropylene glycol and an epoxy compound under presence of the double-metal cyanide catalyst may be provided.

Specifically, the method may include introducing the double-metal cyanide catalyst according to the embodiment of the present disclosure to a high-pressure reactor, then purging an inside of the high-pressure reactor using nitrogen, and injecting polypropylene glycol and the epoxy compound into the reactor. In this regard, it is preferable to continuously supply the epoxy compound thereto such that a pressure may be maintained in the reactor.

After the reaction, an unreacted epoxy compound is removed in a vacuum drying process. Thus, polyoxypropylene polyol (or polyether polyol) may be obtained.

In this regard, the epoxy compound may include at least one selected from compounds of following chemical formulas. The present disclosure is not limited thereto.

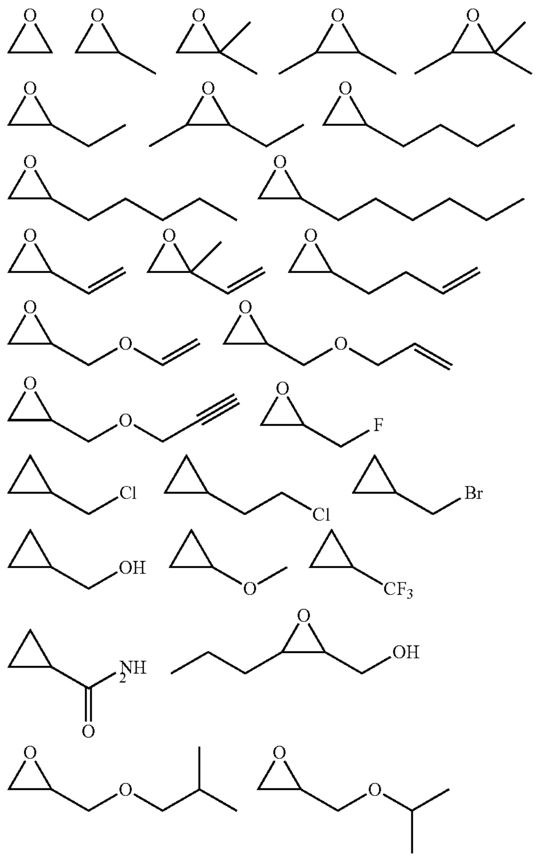

-continued

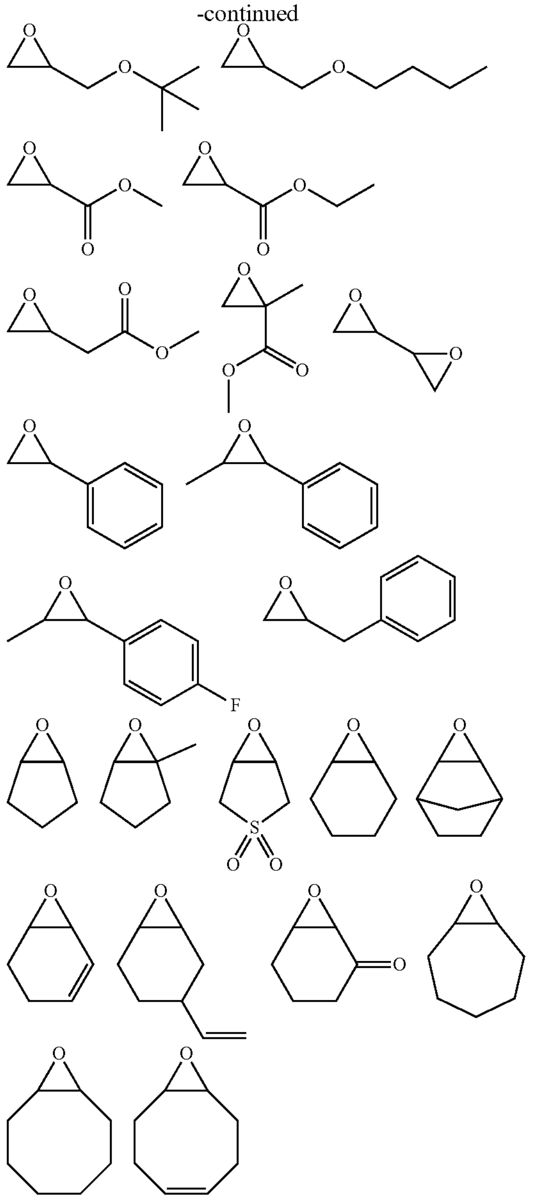

That is, the epoxy compound may include, for example, ethylene oxide, propylene oxide, 2, 2-dimethyloxirane, 2, 3-dimethyloxirane, 2, 2, 3-trimethyloxirane, 2-ethyloxirane, 2-ethyl-3-methyloxirane, 2-pentyloxirane, 2-butyloxirane, 2-hexyloxirane, 2-vinyloxirane, 2-methyl-2-vinyloxirane, 2-(but-3-en-1-yl)oxirane, 2-((vinyloxy)methyl)oxirane, 2-((allyloxy)methyl)oxirane, 2-((prop-2-en-1-yl-enoxy) methyl)oxirane, 2-(fluoromethyl)oxirane, 2-(chloromethyl) oxirane, 2-(2-chloroethyl)oxirane, 2-(bromomethyl)oxirane, oxirane-2-yl-methanol, 2-methoxyoxirane, 2-(trifluoromethyl)oxirane, oxirane-2-carboxamide, (3-propyloxirane-2-yl)methanol, 2-(isobutoxymethyl)oxirane, 2-(isopropoxymethyl)oxirane, 2-(tertiary-butoxymethyl)oxirane, 2-(butoxymethyl)oxirane, methyloxirane-2-carboxylate, ethyloxirane-2-carboxylate, ethyl-2-(oxirane-2-yl)acetate, methyl-2-methyloxirane-2-carboxylate, 2,2'-bioxirane, 2-phenyloxirane, 2-methyl-3-phenyloxirane, 2-(4-fluorophenyl) oxirane, 2-benzyloxirane, sigma-oxabicyclo[3.1.0] hexane, 1-methyl-sigma-oxabicyclo[3.1.0]hexane, sigma-oxa-3-diazabicyclo[3.1.0]hexane, 3,3-idoxide, 7-oxabicyclo

[4.1.0]heptane, 3-oxatricyclo[3.2.1.0.2.4]octane, 7-oxabicyclo[4.1.0]hept-2-en, 3-vinyl-7-oxabicyclo-[4.1.0]heptane, 7-oxabicyclo[4.1.0]heptane-2-1, 8-oxabicyclo[5.1.0]octane, 9-oxabicyclo[6.1.0]nonane, (z)-9-oxabicyclo[6.1.0]non-4-ene, etc. The present disclosure is not limited thereto.

Hereinafter, various Present Examples and Experimental Examples of the present disclosure will be described in detail. However, following Present Examples are only some examples of the present disclosure. The present disclosure should not be construed as being limited to a following Present Examples.

Preparation of Double-Metal Cyanide Catalyst

Silane Compound Containing One Alkoxy Group (—OR)

Present Example 1

We prepares a first solution by mixing 2.05 g of zinc chloride, 2.5 ml of distilled water, and 0.1 ml of ethoxytrimethylsilane (ETMS) with each other in a first beaker. A second solution was prepared by dissolving 0.5 g of potassium hexacyanocobaltate (III) in 2.5 ml of distilled water in a second beaker. Further, a third solution was prepared by mixing 1 ml of ethoxytrimethylsilane (ETMS) and Pluronic P123 (Wyandotte Chemicals Corp.) with each other in a third beaker.

Thereafter, the second solution was added to the first solution and then a mixed solution was stirred at 0° C. for 30 minutes, and then the third solution was additionally added thereto and then the mixed solution was stirred at 0° C. for 10 minutes. Subsequently, a solid was separated therefrom using a centrifugal separator. 5 mL of distilled water and 0.1 mL of ethoxytrimethylsilane (ETMS) solution were additionally injected into a separated catalyst slurry, and then a slurry solution was stirred at 0° C. for 30 minutes, and then the third solution was added thereto and then a mixed solution was stirred at 0° C. for 10 minutes.

After the stirring, a solid was separated therefrom using a centrifugal separator. 5 mL of distilled water and 0.1 mL of ethoxytrimethylsilane (ETMS) solution were additionally injected into a separated catalyst slurry, and a slurry solution was stirred at 0° C. for 30 minutes, and the third solution was added thereto and a mixed solution was stirred at 0° C. for 10 minutes.

Thereafter, a solid was separated therefrom using a centrifugal separator, and a separated catalyst slurry was washed with 10 mL of distilled water and was subjected to separation using a centrifugal separator. A separated product was dried at a temperature of 85° C. and under vacuum. Thus, a double-metal cyanide catalyst (Present Example 1) was prepared

Present Example 2

A double-metal cyanide catalyst was prepared in the same manner as that in Present Example 1, except that a stirring reaction temperature was 10° C.

Present Example 3

A double-metal cyanide catalyst was prepared in the same manner as that in Present Example 1, except that the stirring reaction temperature was 20° C.

Present Example 4

A double-metal cyanide catalyst was prepared in the same manner as that in Present Example 1, except that the stirring reaction temperature was 30° C.

Silane Compound Containing Two Alkoxy Groups (—OR)

Present Example 5

In a first beaker, 2.05 g of zinc chloride, 2.5 ml of distilled water and 0.1 ml of dimethyldiethoxysilane (DMDES) were mixed with each other to prepare a first solution. A second solution was prepared by dissolving 0.5 g of potassium hexacyanocobaltate (III) in 2.5 ml of distilled water in a second beaker. 1 ml of dimethyldiethoxysilane (DIVIDES) and Pluronic P123 (Wyandotte Chemicals Corp.) was mixed with each other in a third beaker to prepare a third solution.

Thereafter, the second solution was added to the first solution and then a mixed solution was stirred at 0° C. for 30 minutes, and then the third solution was additionally added thereto and then a mixed solution was stirred at 0° C. for 10 minutes.

Subsequently, a solid was separated therefrom using a centrifugal separator, and 5 mL of distilled water and 0.1 mL of dimethyldiethoxysilane (DIVIDES) solution were additionally added to a separated catalyst slurry and then a slurry solution was stirred at 0° C. for 30 minutes. Then, the third solution was additionally added thereto and then a mixed solution was stirred at 0° C. for 10 minutes.

After the stirring, a solid was separated therefrom using a centrifugal separator, and 5 mL of distilled water and 0.1 mL of dimethyldiethoxysilane (DMDES) solution are additionally added to a separated catalyst slurry, and then a slurry solution was stirred at 0° C. for 30 minutes. Then, the third solution was additionally added thereto and then a mixed solution was stirred at 0° C. for 10 minutes.

Subsequently, a solid was separated therefrom using a centrifugal separator, and a separated catalyst slurry was washed with 10 mL of distilled water, and was subjected to separation using a centrifugal separator. A separated product was dried at a temperature of 85° C. and under vacuum. Thus, a double-metal cyanide catalyst (Present Example 5) was prepared.

Present Example 6

A double-metal cyanide catalyst was prepared in the same manner as that in Present Example 5, except that a stirring reaction temperature was 10° C.

Present Example 7

A double-metal cyanide catalyst was prepared in the same manner as that in Present Example 5, except that the stirring reaction temperature was 20° C.

Present Example 8

A double-metal cyanide catalyst was prepared in the same manner as that in Present Example 5, except that the stirring reaction temperature was 30° C.

Present Example 9

A double-metal cyanide catalyst was prepared in the same manner as that in Present Example 5, except that the stirring reaction temperature was 55° C.

Silane Compound Containing One Hydroxyl Group (—OH)

Present Example 10

We prepared a first solution by mixing 2.05 g of zinc chloride, 2.5 ml of distilled water, and 0.1 ml of trimethylsilanol (TMS) with each other in the first beaker. A second solution was prepared by dissolving 0.5 g of potassium hexacyanocobaltate (III) in 2.5 ml of distilled water in a second beaker. A third solution was prepared by mixing 1 ml of trimethylsilanol (TMS) and Pluronic P123 (Wyandotte Chemicals Corp.) with each other in a third beaker.

Thereafter, the second solution was added to the first solution and then a mixed solution was stirred at 30° C. for 30 minutes, and then the third solution was additionally added thereto and then a mixed solution was stirred at 30° C. for 10 minutes.

Subsequently, a solid was separated therefrom using a centrifugal separator, and 5 mL of distilled water and 0.1 mL of trimethylsilanol (TMS) solution were additionally injected into a separated catalyst slurry, and then a slurry solution was stirred at 30° C. for 30 minutes. Then, the third solution was added thereto and then a mixed solution was stirred at 30° C. for 10 minutes.

Subsequently, a solid was separated therefrom using a centrifugal separator, and 5 mL of distilled water and 0.1 mL of trimethylsilanol (TMS) solution were additionally injected into a separated catalyst slurry, and then a slurry solution was stirred at 30° C. for 30 minutes. Then, the third solution was added thereto and then a mixed solution was stirred at 30° C. for 10 minutes.

Subsequently, a solid was separated therefrom using a centrifugal separator, and a separated catalyst slurry was washed with 10 mL of distilled water, and was subjected to separation using a centrifugal separator. A separated product was dried at a temperature of 85° C. and under vacuum. Thus, a double-metal cyanide catalyst (Present Example 10) was prepared.

Present Example 11

A double-metal cyanide catalyst was prepared in the same manner as that in Present Example 10, except that 0.3 ml of trimethylsilanol (TMS) was used instead of 0.1 ml thereof in the first solution and the additional injection thereof.

Present Example 12

We prepared a first solution by mixing 2.05 g of zinc chloride, 2.5 ml of distilled water and 0.25 ml of trimethylsilanol (TMS) with each other in the first beaker. A second solution was prepared by dissolving 0.5 g of potassium hexacyanocobaltate (III) in 2.5 ml of distilled water in a second beaker. A third solution was prepared by mixing 0.25 ml of trimethylsilanol (TMS) and Pluronic P123 (Wyandotte Chemicals Corp.) with each other in a third beaker.

Thereafter, the second solution was added to the first solution and then a mixed solution was stirred at 30° C. for 30 minutes, and the third solution was additionally added thereto and then a mixed solution was stirred at 30° C. for 10 minutes.

Subsequently, a solid was separated therefrom using a centrifugal separator, and a separated catalyst slurry was washed with 10 mL of distilled water, and was subjected to separation using a centrifugal separator. A separated product was dried at a temperature of 85° C. and under vacuum. Thus, a double-metal cyanide catalyst (Present Example 12) was prepared.

Present Example 13

A double-metal cyanide catalyst was prepared in the same manner as that in Present Example 12, except that 0.3 ml and 1 ml of trimethylsilanol (TMS) were used in the first solution and the third solution, respectively.

Present Example 14

A double-metal cyanide catalyst was prepared in the same manner as that in Present Example 12, except that 0.5 ml and 1 ml of trimethylsilanol (TMS) were used in the first and third solutions, respectively.

Present Example 15

A double-metal cyanide catalyst was prepared in the same manner as that in Present Example 12, except that 0.7 ml and 1 ml of trimethylsilanol (TMS) were used in the first and third solutions, respectively.

Present Example 16

A double-metal cyanide catalyst was prepared in the same manner as that in Present Example 12, except that 1.0 ml and 1 ml of trimethylsilanol (TMS) were used in the first solution and the third solution, respectively.

Present Example 17

A double-metal cyanide catalyst was prepared in the same manner as that in Present Example 13, except that 1.635 g of zinc chloride was used instead of 2.05 g thereof in the first solution.

Present Example 18

A double-metal cyanide catalyst was prepared in the same manner as that in Present Example 13, except that 1.227 g of zinc chloride was used instead of 2.05 g thereof in the first solution.

Present Example 19

A double-metal cyanide catalyst was prepared in the same manner as that in Present Example 13, except that 1.818 g of zinc chloride was used instead of 2.05 g thereof in the first solution.

Present Example 20

A double-metal cyanide catalyst was prepared in the same manner as that in Present Example 13, except that 0.409 g of zinc chloride was used instead of 2.05 g thereof in the first solution.

2-Trimethylsilyl Ethanol Including One Alcohol Group (—ROH)

Present Example 21

In a first beaker, 2.05 g of zinc chloride, 2.5 ml of distilled water and 0.1 ml of 2-trimethylsilyl ethanol were mixed with each other to prepare a first solution. A second solution was prepared by dissolving 0.5 g of potassium hexacyanocobaltate (III) in 2.5 ml of distilled water in a second beaker. Then, a third solution was prepared by mixing 1 ml of 2-trimethylsilyl ethanol and Pluronic P123 (Wyandotte Chemicals Corp.) with each other in a third beaker.

Thereafter, the second solution was added to the first solution and then a mixed solution was stirred at 30° C. for 30 minutes, and then the third solution was additionally added thereto and then a mixed solution was stirred at 30° C. for 10 minutes.

Subsequently, a solid was separated therefrom using a centrifugal separator, and 5 mL of distilled water and 0.1 mL of 2-trimethylsilyl ethanol solution were additionally added to a separated catalyst slurry, and then a slurry solution was stirred at 30° C. for 30 minutes. The third solution was additionally added thereto and then a mixed solution was stirred at 30° C. for 10 minutes.

Subsequently, a solid was separated therefrom using a centrifugal separator, and 5 mL of distilled water and 0.1 mL of 2-trimethylsilyl ethanol solution were additionally injected into a separated catalyst slurry, and then a slurry solution was stirred at 30° C. for 30 minutes, and the third solution was added thereto and then a mixed solution was stirred at 30° C. for 10 minutes.

Thereafter, a solid was separated therefrom using a centrifugal separator, and a separated catalyst slurry was washed with 10 mL of distilled water and was subjected to separation using a centrifugal separator. A separated product was dried at a temperature of 85° C. and under vacuum. Thus, a double-metal cyanide catalyst (Present Example 21) was prepared.

Trimethylsilyl Acetate Including One Alkoxy Group (—OR)

Present Example 22

We prepared a first solution by mixing 2.05 g of zinc chloride, 2.5 ml of distilled water and 0.1 ml of trimethylsilyl acetate with each other in the first beaker. A second solution was prepared by dissolving 0.5 g of potassium hexacyanocobaltate (III) in 2.5 ml of distilled water in a second beaker. 1 ml of trimethylsilyl acetate and Pluronic P123 (Wyandotte Chemicals Corp.) were mixed with each other in a third beaker to prepare a third solution.

Thereafter, the second solution was added to the first solution and then a mixed solution was stirred at 30° C. for 30 minutes, and the third solution was additionally added thereto and then a mixed solution was stirred at 30° C. for 10 minutes.

Subsequently, a solid was separated therefrom using a centrifugal separator, and 5 mL of distilled water and 0.1 mL of trimethylsilyl acetate solution were additionally injected into a separated catalyst slurry, and then a slurry solution was stirred at 30° C. for 30 minutes, and then the third solution was additionally added thereto and then a mixed solution was stirred at 30° C. for 10 minutes.

Subsequently, a solid was separated therefrom using a centrifugal separator, and 5 mL of distilled water and 0.1 mL of trimethylsilyl acetate solution were additionally injected into a separated catalyst slurry, and then, a slurry solution was stirred at 30° C. for 30 minutes. The third solution was additionally added thereto and then a mixed solution was stirred at 30° C. for 10 minutes.

Subsequently, a solid was separated therefrom using a centrifugal separator, and a separated catalyst slurry was washed with 10 mL of distilled water, and was subjected to separation using a centrifugal separator. A separated product was dried at a temperature of 85° C. and under vacuum. Thus, a double-metal cyanide catalyst (Present Example 22) was prepared.

Present Example 23

A double-metal cyanide catalyst was prepared in the same manner as that in Present Example 22, except that the stirring reaction temperature was 50° C.

Present Example 24

A double-metal cyanide catalyst was prepared in the same manner as that in Present Example 22, except that the stirring reaction temperature was 70° C.

Present Example 25

A double-metal cyanide catalyst was prepared in the same manner as that in Present Example 23, except that 0.25 ml of trimethylsilyl acetate was used in the first solution, the third solution, and the additional injection thereof.

Present Example 26

A double-metal cyanide catalyst was prepared in the same manner as that in Present Example 23, except that 0.3 ml of trimethylsilyl acetate was used in the first solution, the third solution, and the additional injection thereof.

Present Example 27

A double-metal cyanide catalyst was prepared in the same manner as that in Present Example 23, except that 0.4 ml of trimethylsilyl acetate was used in the first solution, the third solution, and the additional injection thereof.

Present Example 28

A double-metal cyanide catalyst was prepared in the same manner as that in Present Example 23, except that 0.5 ml of trimethylsilyl acetate was used in the first solution, the third solution, and the additional injection thereof.

Present Example 29

A double-metal cyanide catalyst was prepared in the same manner as that in Present Example 23, except that 0.3 ml, 1 ml, and 0.3 ml of trimethylsilyl acetate were used in the first solution, the third solution, and the additional injection thereof, respectively.

Silane Compound Containing Three Alkoxy Groups (—OR)

Present Example 30

We prepared a first solution by mixing 2.05 g of zinc chloride, 2.5 ml of distilled water and 0.1 ml of triethoxymethylsilane (TEMS) with each other in the first beaker. A second solution was prepared by dissolving 0.5 g of potassium hexacyanocobaltate (III) in 2.5 ml of distilled water in a second beaker. 1 ml of triethoxymethylsilane (TEMS) and Pluronic P123 (Wyandotte Chemicals Corp.) were mixed each other to prepare a third solution.

Thereafter, the second solution was added to the first solution and then a mixed solution was stirred at 0° C. for 30 minutes, and then the third solution was additionally added thereto and then a mixed solution was stirred at 0° C. for 10 minutes.

Subsequently, a solid was separated therefrom using a centrifugal separator, and 5 mL of distilled water and 0.1 mL of a triethoxymethylsilane (TEMS) solution were additionally injected into a separated catalyst slurry and then a slurry solution was stirred at 0° C. for 30 minutes. The third solution was additionally added thereto and then a mixed solution was stirred at 0° C. for 10 minutes.

Subsequently, a solid was separated therefrom using a centrifugal separator, and 5 mL of distilled water and 0.1 mL of triethoxymethylsilane (TEMS) were additionally injected into a separated catalyst slurry, and then a slurry solution was stirred at 0° C. for 30 minutes, and then the third solution was additionally added thereto and then a mixed solution was stirred at 0° C. for 10 minutes.

Subsequently, a solid was separated therefrom using a centrifugal separator, and a separated catalyst slurry was washed with 10 mL of distilled water, and was subjected to separation using a centrifugal separator. A separated product was dried at a temperature of 85° C. and under vacuum. Thus, a double-metal cyanide catalyst (Present Example 30) was prepared.

Present Example 31

A double-metal cyanide catalyst was prepared in the same manner as that in Present Example 30, except that the stirring reaction temperature was 20° C.

Present Example 32

A double-metal cyanide catalyst was prepared in the same manner as that in Present Example 30, except that the stirring reaction temperature was 40° C.

Present Example 33

A double-metal cyanide catalyst was prepared in the same manner as that in Present Example 30, except that the stirring reaction temperature was 60° C.

Present Example 34

Free of Co-Complexing Agent

We prepared a first solution by mixing 2.05 g of zinc chloride, 2.5 ml of distilled water, and 0.1 ml of trimethylsilanol (TMS) with each other in the first beaker. A second solution was prepared by dissolving 0.5 g of potassium hexacyanocobaltate (III) in 2.5 ml of distilled water in a second beaker. 1 ml of trimethylsilanol (TMS) was added to a third beaker to prepare a third solution.

Thereafter, the second solution was added to the first solution and then a mixed solution was stirred at 30° C. for 30 minutes, and then the third solution was additionally added thereto and then a mixed solution was stirred at 30° C. for 10 minutes.

Subsequently, a solid was separated therefrom using a centrifugal separator, and 5 mL of distilled water and 0.1 mL of trimethylsilanol (TMS) solution were additionally injected into a separated catalyst slurry, and then a slurry solution was stirred at 30° C. for 30 minutes, and then the third solution was added thereto and then a mixed solution was stirred at 30° C. for 10 minutes.

Subsequently, a solid was separated therefrom using a centrifugal separator, and 5 mL of distilled water and 0.1 mL of trimethylsilanol (TMS) solution were additionally injected into a separated catalyst slurry, and then a slurry solution was stirred at 30° C. for 30 minutes. The third solution was additionally added thereto and then a mixed solution was stirred at 30° C. for 10 minutes.

Subsequently, a solid was separated therefrom using a centrifugal separator, and a separated catalyst slurry was washed with 10 mL of distilled water, and was subjected to separation using a centrifugal separator. A separated product was dried at a temperature of 85° C. and under vacuum. Thus, a double-metal cyanide catalyst (Present Example 34) was prepared.

Comparative Example 1

In Comparative Example 1, a double-metal cyanide catalyst was prepared without using the complexing agent and the co-complexing agent.

Silane Compound Containing 4 Alkoxy Groups (—OR)

Comparative Example 35

We prepared a first solution by mixing 2.05 g of zinc chloride, 2.5 ml of distilled water and 0.1 ml of tetraethoxysilane (TEOS) with each other in a first beaker. A second solution was prepared by dissolving 0.5 g of potassium hexacyanocobaltate (III) in 2.5 ml of distilled water in a second beaker. A third solution was prepared by mixing 1 ml of tetraethoxysilane (TEOS) and Pluronic P123 (Wyandotte Chemicals Corp.) with each other in a third beaker.

Thereafter, the second solution was added to the first solution and then a mixed solution was stirred at 25° C. for 30 minutes, then the third solution was additionally added thereto and then a mixed solution was stirred at 25° C. for 10 minutes.

Subsequently, a solid was separated therefrom using a centrifugal separator, and 5 mL of distilled water and 0.1 mL of tetraethoxysilane (TEOS) solution were additionally injected into a separated catalyst slurry, and a slurry solution was stirred at 25° C. for 30 minutes. The third solution was additionally added thereto and then a mixed solution was stirred at 25° C. for 10 minutes.

Subsequently, a solid was separated therefrom using a centrifugal separator, and 5 mL of distilled water and 0.1 mL of tetraethoxysilane (TEOS) were additionally injected into a separated catalyst slurry, and then a slurry solution was stirred at 25° C. for 30 minutes. The third solution was additionally added thereto and then a mixed solution was stirred at 25° C. for 10 minutes.

Subsequently, a solid was separated therefrom using a centrifugal separator, and a separated catalyst slurry was washed with 10 mL of distilled water, and was subjected to separation using a centrifugal separator. A separated product was dried at a temperature of 85° C. and under vacuum. Thus, a double-metal cyanide catalyst (Comparative Example 35) was prepared.

Comparative Example 36

A double-metal cyanide catalyst was prepared in the same manner as that in Comparative Example 35, except that the stirring reaction temperature was 50° C.

Comparative Example 37

A double-metal cyanide catalyst was prepared in the same manner as that in Comparative Example 35, except that the stirring reaction temperature was 70° C.

Comparative Example 38

A double-metal cyanide catalyst was prepared in the same manner as that in Comparative Example 35, except that the stirring reaction temperature was 90° C.

1) X-Ray Diffraction Analysis of Catalysts

Figure 2:
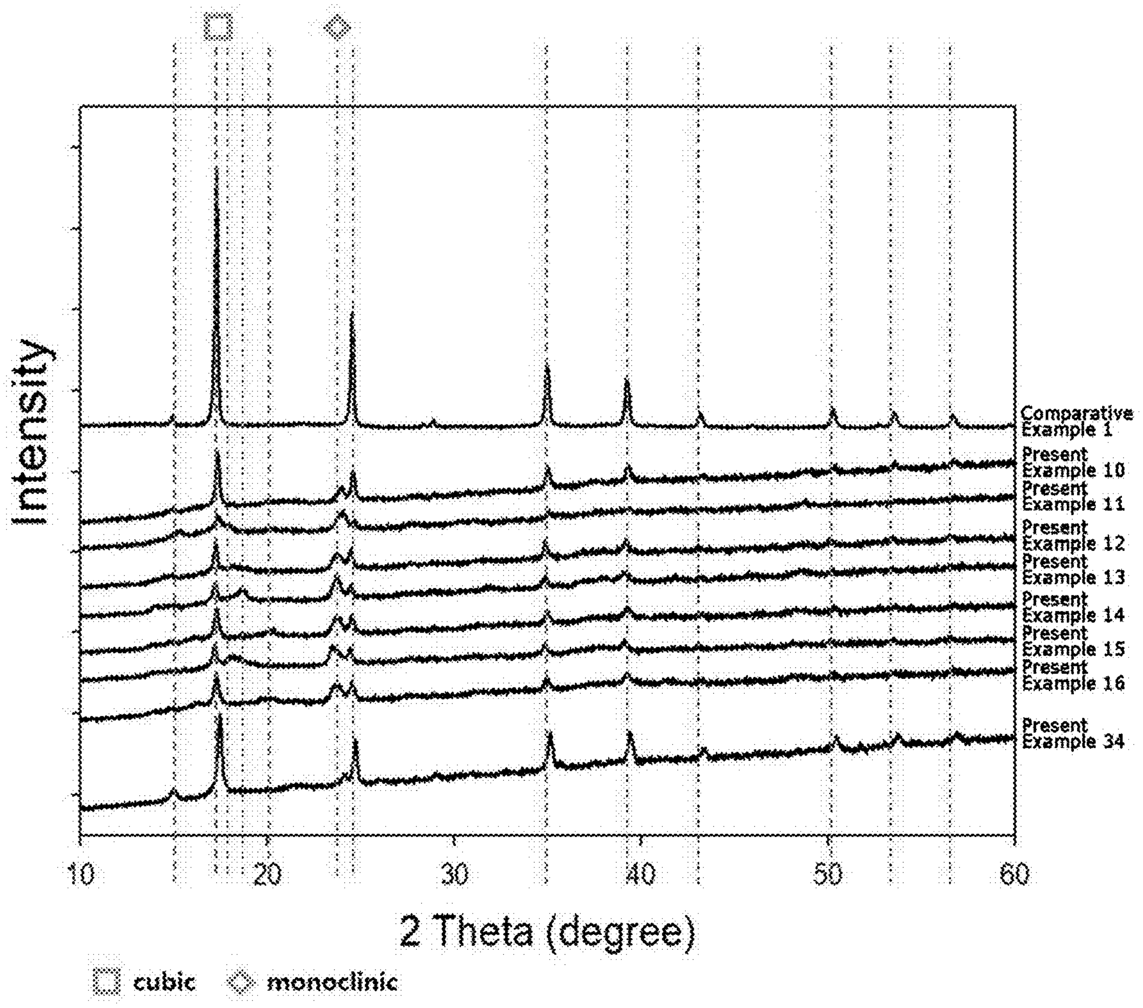
FIG. 2 is a diagram showing an X-ray diffraction analysis spectrum of a catalyst according to each of Present Examples 10 to 16, Present Example 34 and Comparative Example 1.
Figure 3:
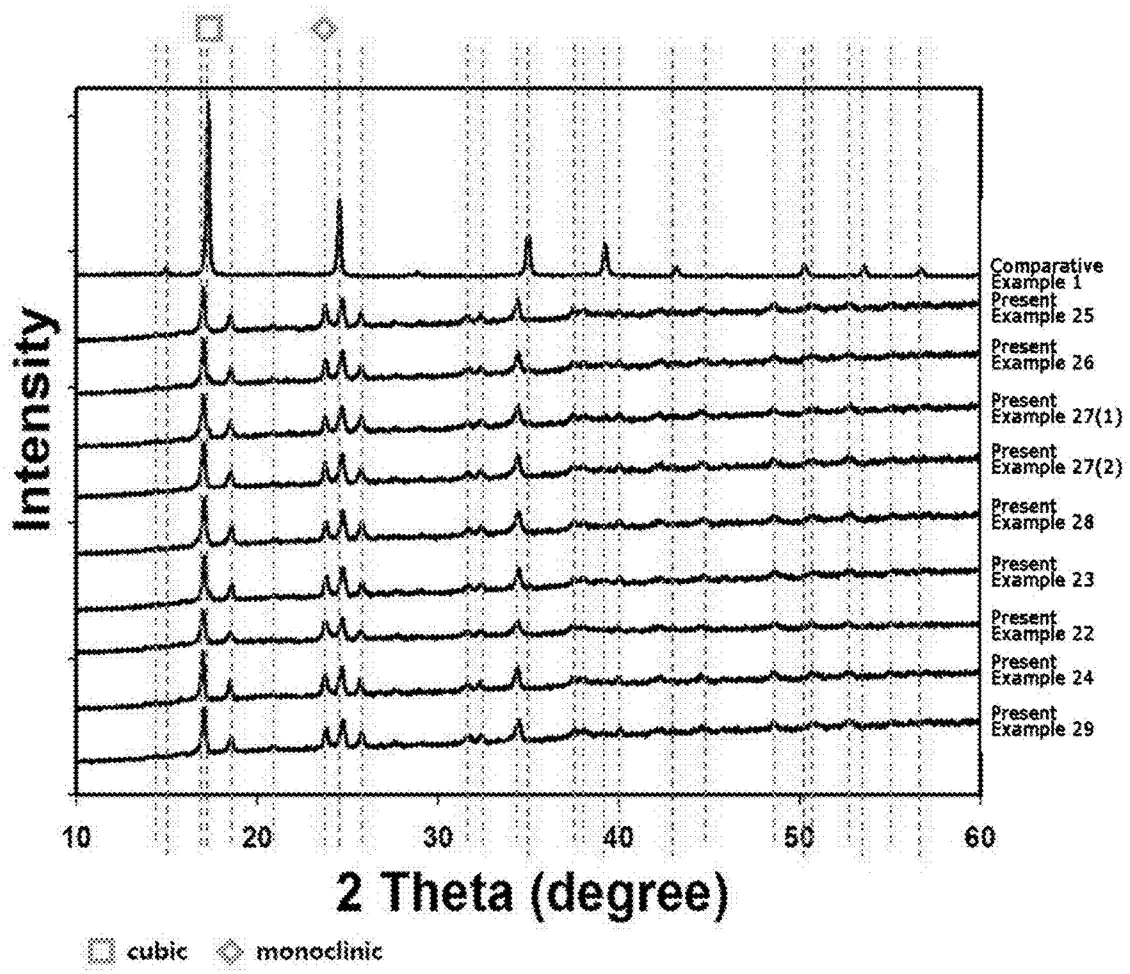
FIG. 3 shows an X-ray diffraction analysis spectrum of a catalyst according to each of Present Examples 22 to 29 and Comparative Example 1.

FIG. 1 shows an X-ray diffraction analysis spectrum of a catalyst according to each of Present Examples 1 to 9 and Comparative Example 1. FIG. 2 is a diagram showing an X-ray diffraction analysis spectrum of a catalyst according to each of Present Examples 10 to 16, Present Example 34 and Comparative Example 1. FIG. 3 shows an X-ray diffraction analysis spectrum of a catalyst according to each of Present Examples 22 to 29 and Comparative Example 1.

Referring to FIG. 1 and FIG. 2, in Comparative Example 1 in which the complexing agent and the co-complexing agent are not incorporated in a matrix, a major peak indicating a high crystallinity of a cubic phase (Fm-3m) characterized by reflection at 2θ=14.9°, 17.1°, 24.3°, and 35.1° may be observed.

Further, referring to FIGS. 1 to 3, in the catalysts of Present Examples 1 to 16, except for that of Present Example 34 which does not include the co-complexing agent, the complexing agent and the co-complexing agent were incorporated into the catalyst matrix to interfere with crystal growth. Thus, 2θ=14.9° as one of main peaks that appears when crystallinity is very high does not appear, or peak concentrations of 2θ=17.1°, 24.3°, 35.1° are greatly reduced, and 2θ=15.1°, 17.8°, 18.51°, 20.1° to 23.7 to 23.8° as monoclinic peaks newly appearing at the same time as decrease of 24.3° peak are wide. Thus, it may be identified that the crystallinity is greatly reduced.

In one example, referring to FIG. 3, in the catalysts of Examples 22 to 29 using trimethylsilyl acetate containing one alkoxy group (—OR) as a complexing agent, the complexing agent and the co-complexing agent are incorporated into the catalyst matrix. Thus, peak concentrations of 2θ=14.9°, 17.1°, 24.3°, and 35.1° which are some of the main peaks that appear when crystallinity is very high significantly decrease, or slightly shift toward 2θ=14.4°, 17°, 24.6°, and 34.4°. New peaks of 2θ=18.51°, 23.8° 25.8° to 31 to 57° as various types of monoclinic peak appear. Thus, decrease in crystallinity and an increase in a surface area may be identified.

Further, as shown in FIG. 2, Present Example 34 free of the co-complexing agent was compared with Comparative Example 1. As the complexing agent was incorporated into the catalyst matrix, the catalyst particle size is decreased, and a concentration of the main peak of catalyst crystallinity is generally decreased. However, it may be identified that the crystallinity decreases slightly based on relative comparison of the peak concentration ratio.

This indicates that the co-complexing agent plays a major role in controlling the size of the catalyst particles and the co-complexing agent together with the complexing agent are incorporated into the catalyst matrix so as to reduce the crystallinity.

That is, the catalysts according to the Present Examples of the present disclosure have crystallinity values varying depending on whether the complexing agent and/or the co-complexing agent are introduced into the matrix. However, it may be identified that all of the catalysts according to the Present Examples of the present disclosure have an amorphous structure with a lower crystallinity compared to that of Comparative Example 1.

2) XPS Spectrum Results of Catalysts

Figure 4:
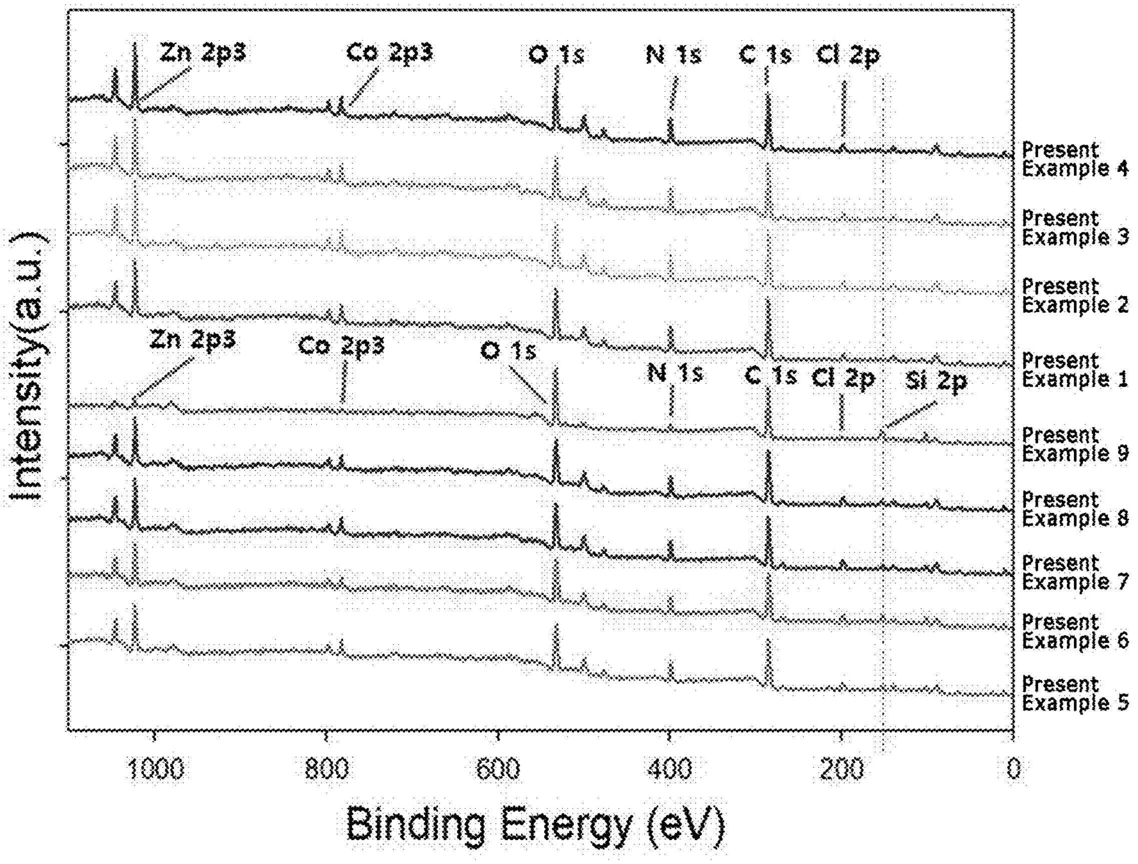
FIG. 4 shows an XPS spectrum of a catalyst according to Present Examples 1 to 9.
Figure 5:
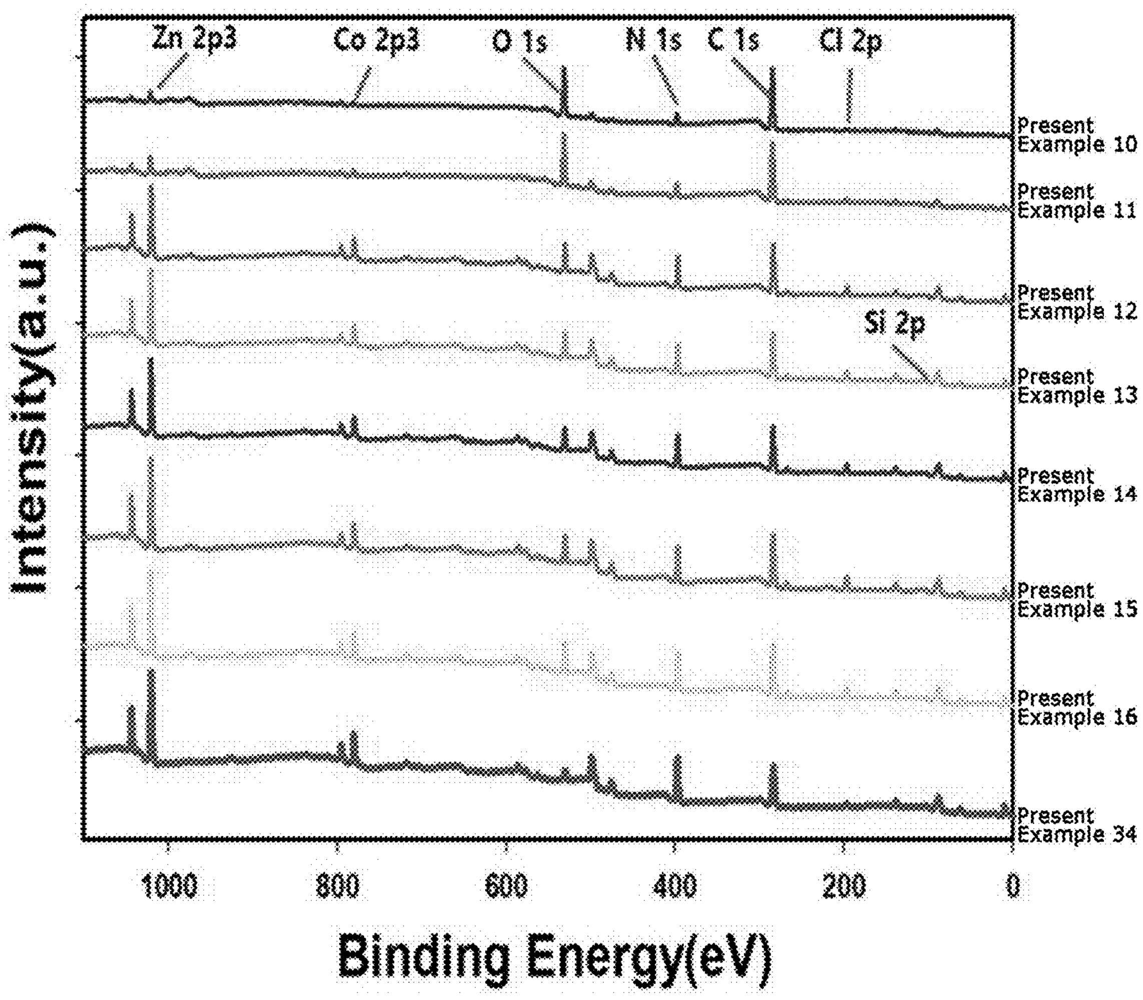
FIG. 5 shows an XPS spectrum of a catalyst according to each of Present Examples 10 to 16 and Present Example 34.

FIG. 4 is a diagram showing an XPS spectrum of the double-metal cyanide catalyst prepared according to each of Present Examples 1 to 9. FIG. 5 is a diagram showing an XPS spectrum of the double-metal cyanide catalyst prepared according to each of Present Examples 10 to 16 and Present Example 34. Table 1 is a table showing an atomic mass (At %) of each of constituent elements of each of the catalysts.

TABLE 1

| Catalyst (prep. temp. in° C.) | XPS(At %) | | | | | | |
|---|---|---|---|---|---|---|---|
| | Zn | Co | Si | C | N | Cl | O |
| Present Example 4 | 7.63 | 2.28 | — | 58.45 | 12.93 | 3.23 | 15.48 |
| Present Example 3 | 7.62 | 2.33 | — | 58.3 | 13.1 | 2.44 | 16.22 |
| Present Example 2 | 7.48 | 2.38 | — | 56.74 | 14 | 2.53 | 16.87 |
| Present Example 1 | 5.56 | 2.24 | — | 60.71 | 12.46 | 2.75 | 16.11 |
| Present Example 9 | 0.41 | 0.23 | 13.5 | 56.46 | 2.55 | 1.19 | 25.66 |
| Present Example 8 | 5.58 | 1.48 | 4.37 | 55.85 | 11.26 | 3.67 | 17.8 |
| Present Example 7 | 5.45 | 1.95 | 3.98 | 56 | 10.89 | 3.64 | 18.08 |
| Present Example 6 | 4.71 | 1.44 | 6.63 | 55.29 | 9.38 | 3.43 | 19.12 |
| Present Example 5 | 8.25 | 2.43 | 1.38 | 53.93 | 13.75 | 4.25 | 16.02 |
| Present Example 10 | 1.38 | 0.66 | — | 72.23 | 5.54 | 0.75 | 19.43 |
| Present Example 11 | 1.85 | 0.75 | — | 70.51 | 6.09 | 1.53 | 19.27 |
| Present Example 12 | 9.06 | 2.91 | 0.23 | 54.41 | 17.56 | 5.02 | 10.81 |
| Present Example 13 | 9.85 | 2.98 | — | 53.13 | 17.67 | 5.65 | 10.72 |
| Present Example 14 | 10.28 | 3.29 | — | 51.49 | 19.44 | 5.39 | 10.11 |
| Present Example 15 | 10.42 | 3.11 | — | 51.83 | 18.59 | 6.63 | 9.42 |
| Present Example 16 | 9.73 | 3.27 | — | 52.14 | 19.5 | 5.04 | 10.34 |
| Present Example 34 | 8.2 | 3.11 | 0.59 | 51.87 | 29.65 | 1.8 | 4.78 |

FIGS. 4 to 5, and Table 1 are schematics to prove an atomic mass (At %) of each of specific constituent elements of each of the metal and the electron-donating complexing agent in the catalyst. It may be identified that the constituent elements of the catalyst are Zn, Co, 0, N, C, Cl and Si.

3) Image and Component Analysis of Each of Catalysts

We selected the catalysts prepared according to each of Present Example 4, Present Example 7, Present Example 10, Present Example 11, Present Example 13, and Present Example 34 from among the synthesized catalysts. A high-resolution image of each sample surface was taken and component analysis of each sample was performed. In this regard, for component analysis, an electron beam writing process device and a scanning electron microscope FE-SEM (with EDS) device were used. The electron beam was scanned to the sample and secondary electrons and X-rays generated from the sample were detected. In this way, the component analysis on the sample surface was performed.

Figure 6:
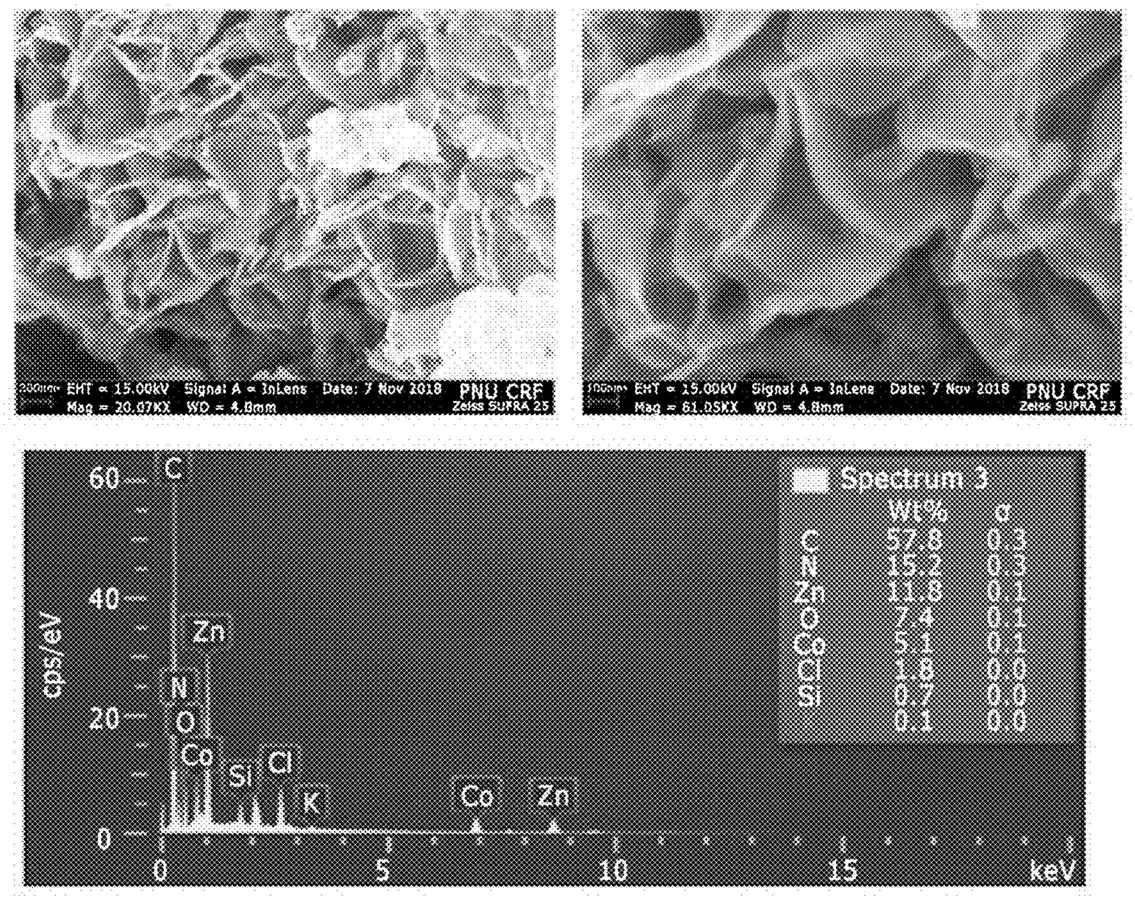
FIG. 6 to FIG. 7 are diagrams showing a high-resolution image and a component analysis result of a catalyst in accordance with Present Example 4.
Figure 7:
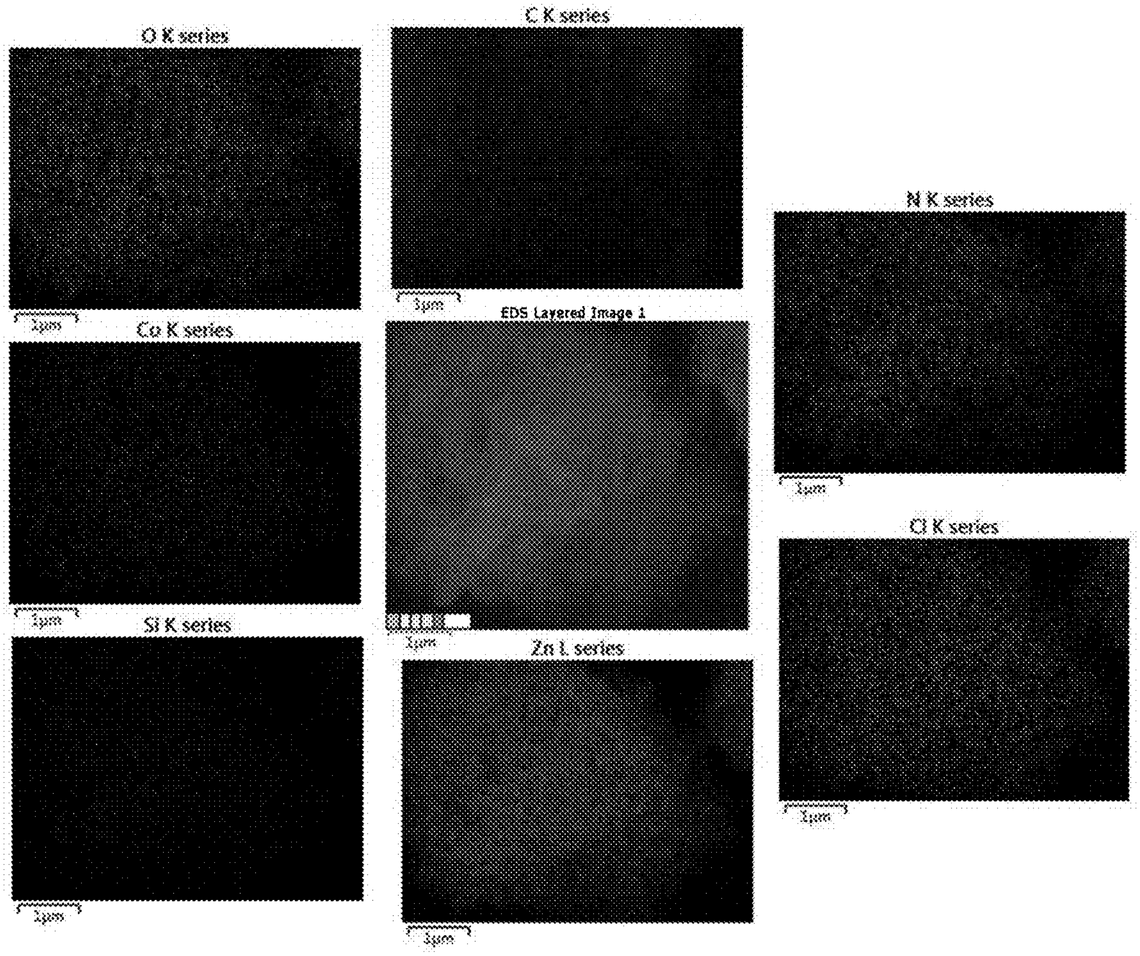
Figure 8:
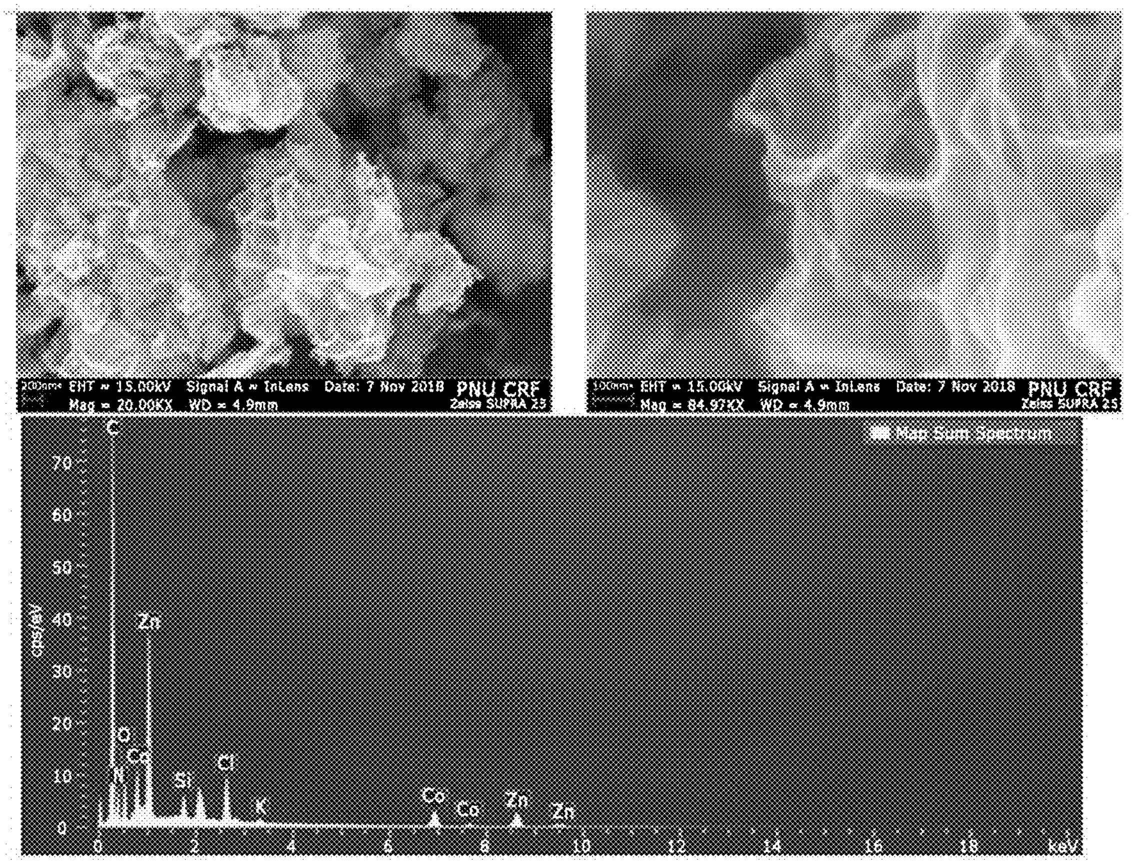
FIG. 8 to FIG. 9 are diagrams showing a high-resolution image and a component analysis result of a catalyst according to Present Example 7.
Figure 9:
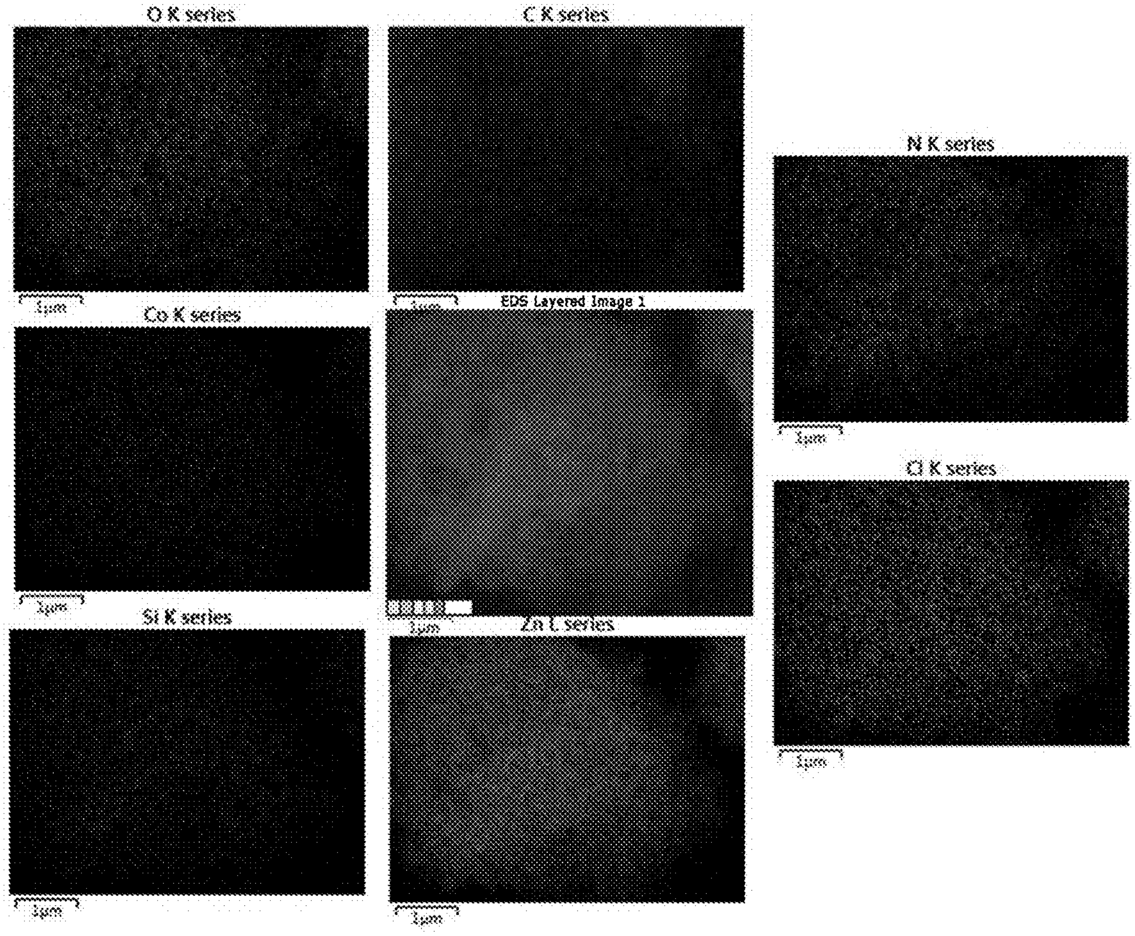
Figure 10:
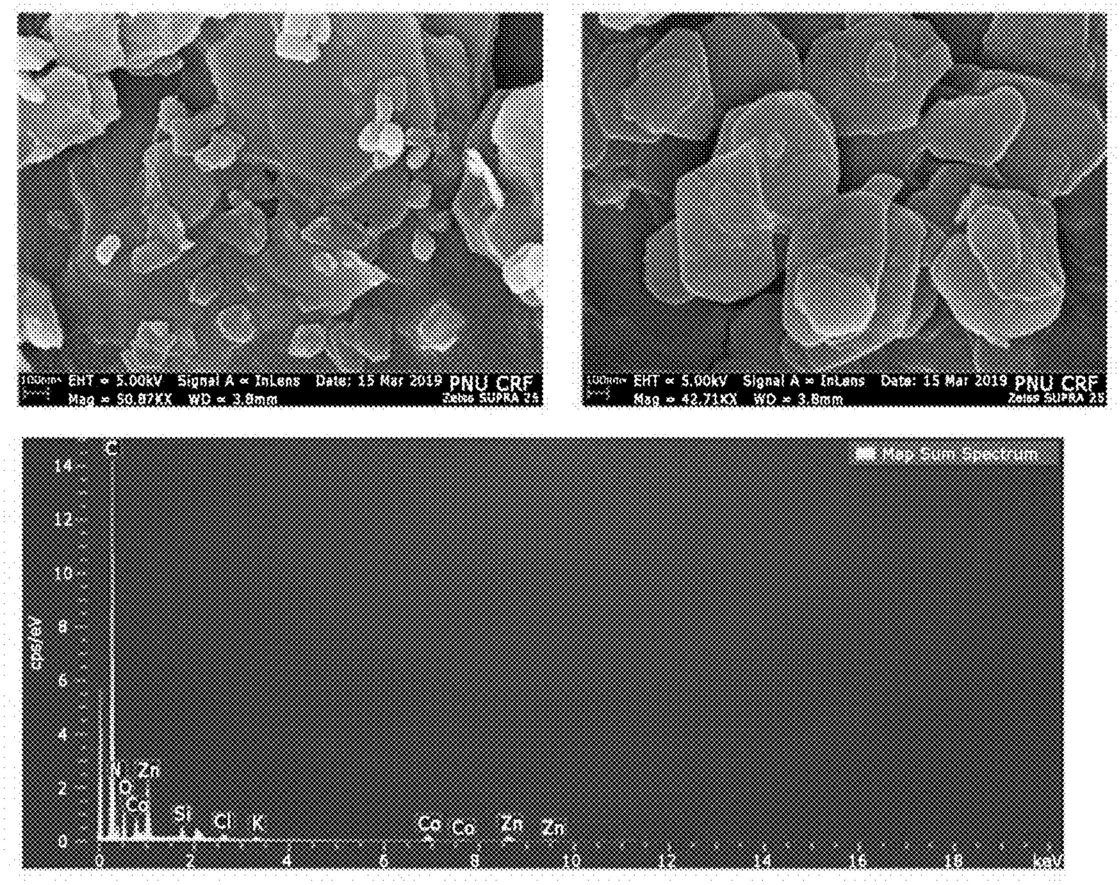
FIG. 10 to FIG. 11 are diagrams showing a high-resolution image and a component analysis result of a catalyst according to Present Example 10.
Figure 11:
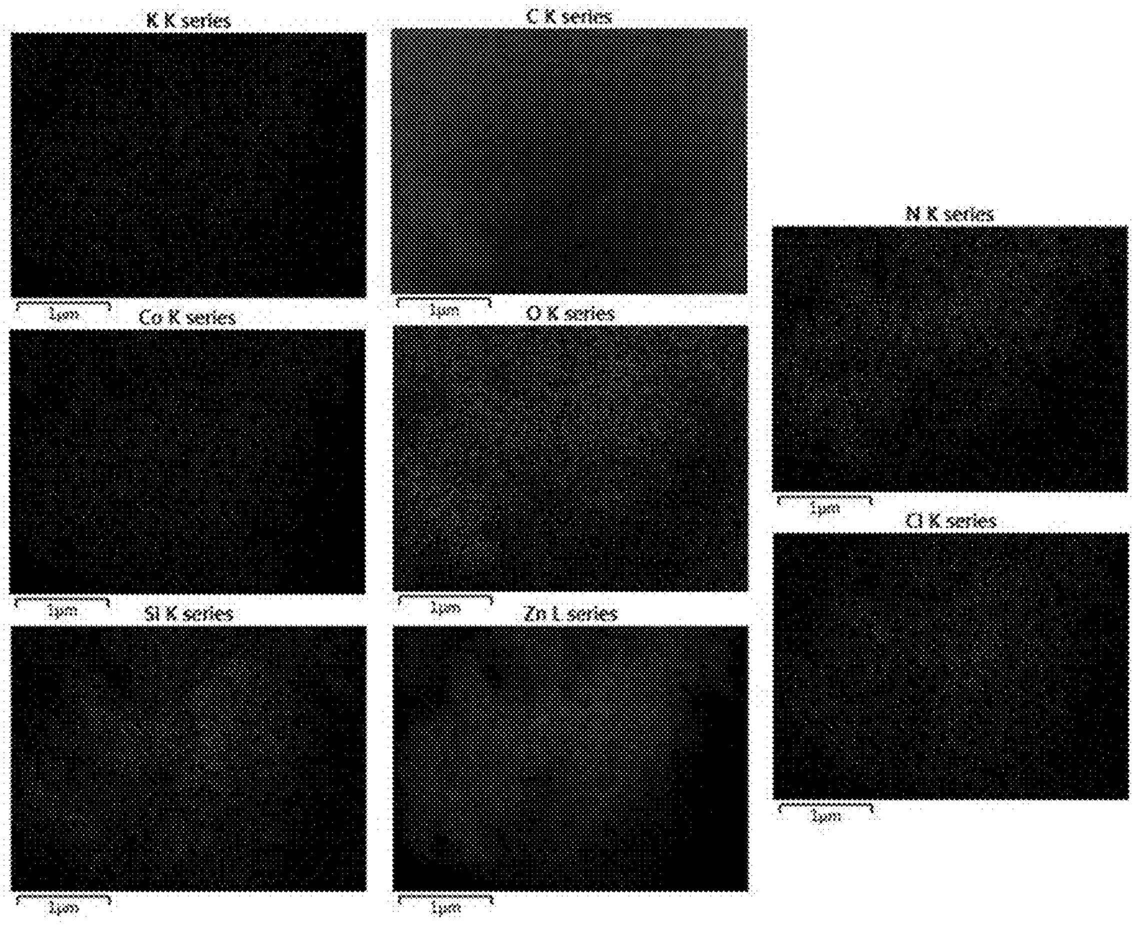
Figure 12:
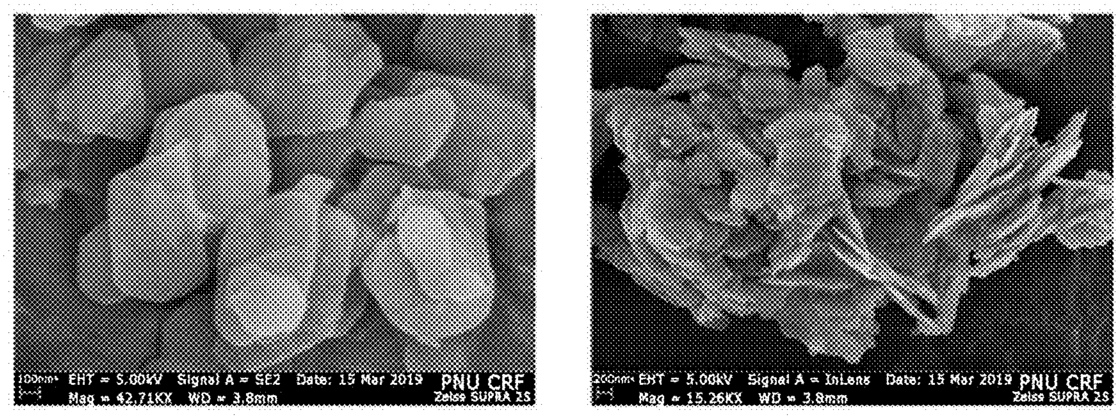
FIG. 12 is a high-resolution image of a catalyst according to Present Example 11.
Figure 13:
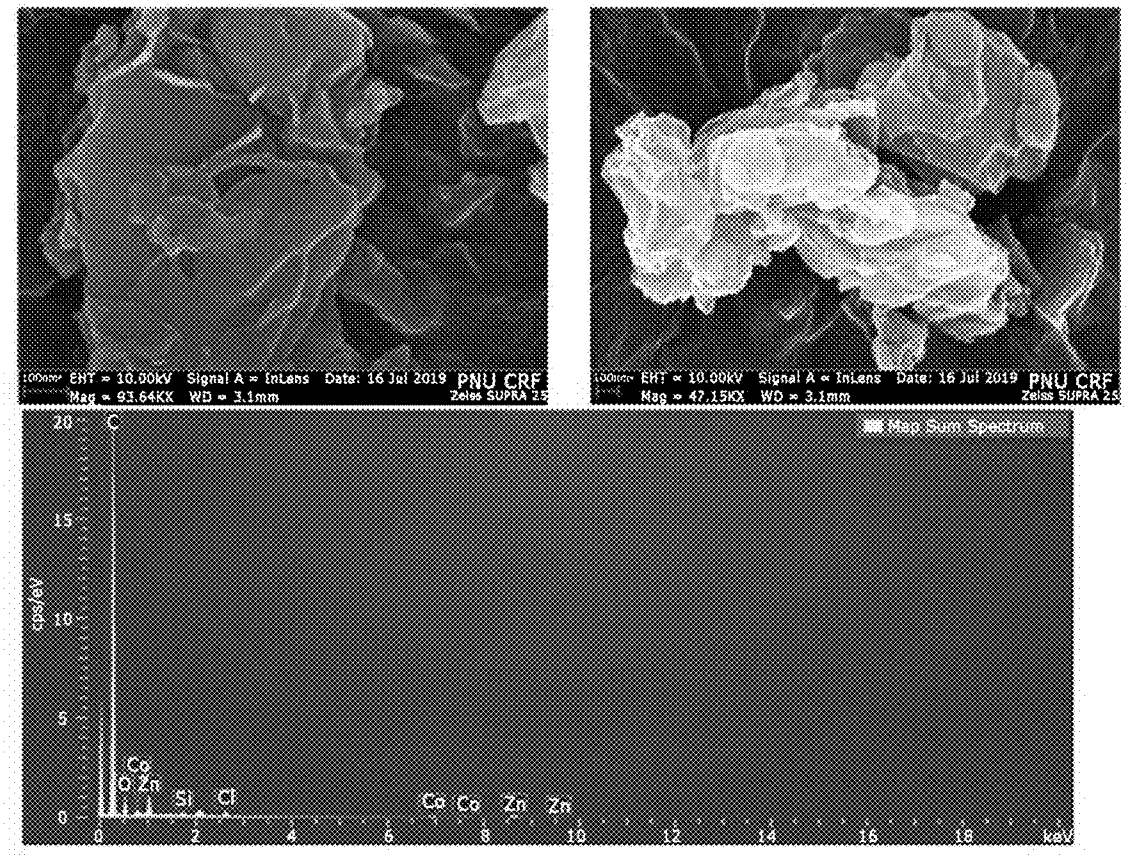
FIG. 13 to FIG. 14 are diagrams showing a high-resolution image and a component analysis result of a catalyst according to Present Example 13.
Figure 14:
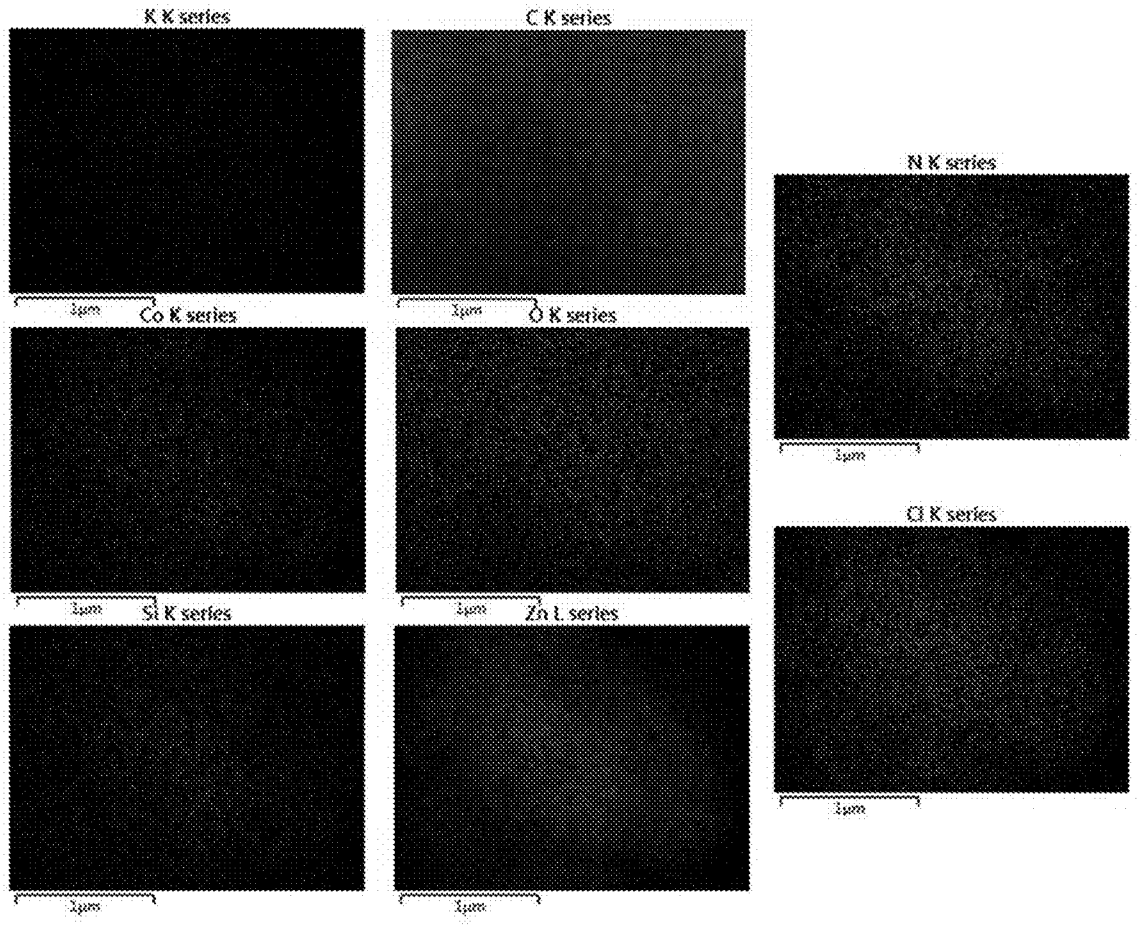
Figure 15:
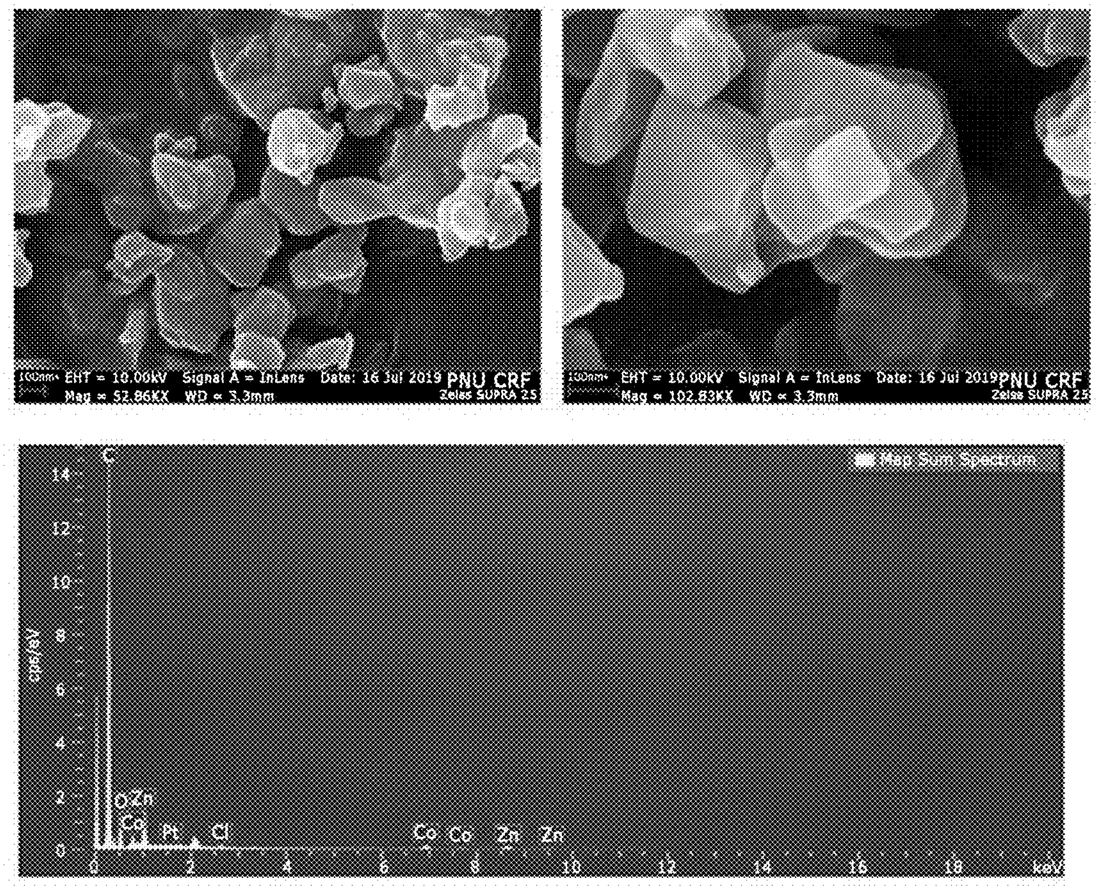
FIG. 15 to FIG. 16 are diagrams showing a high-resolution image and a component analysis result of a catalyst according to Present Example 34.
Figure 16:
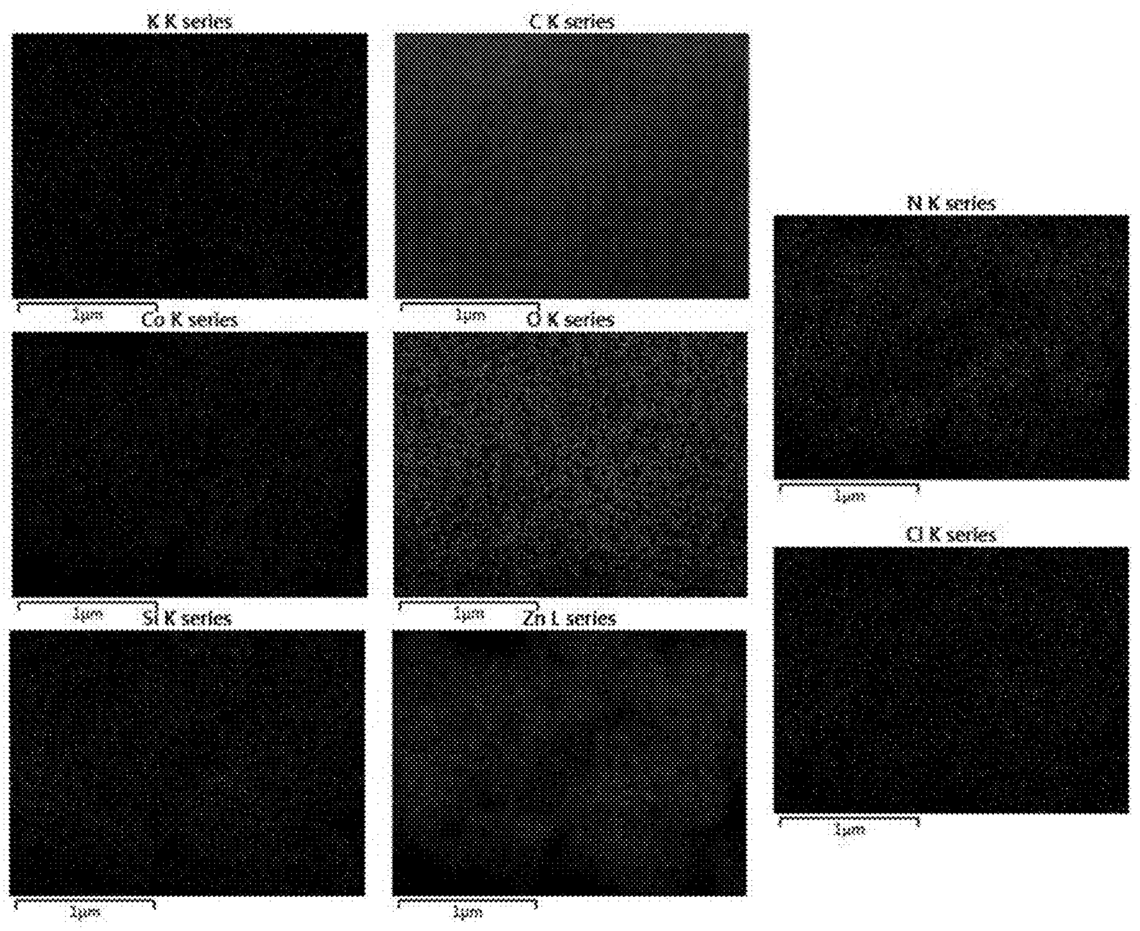
Figure 17:
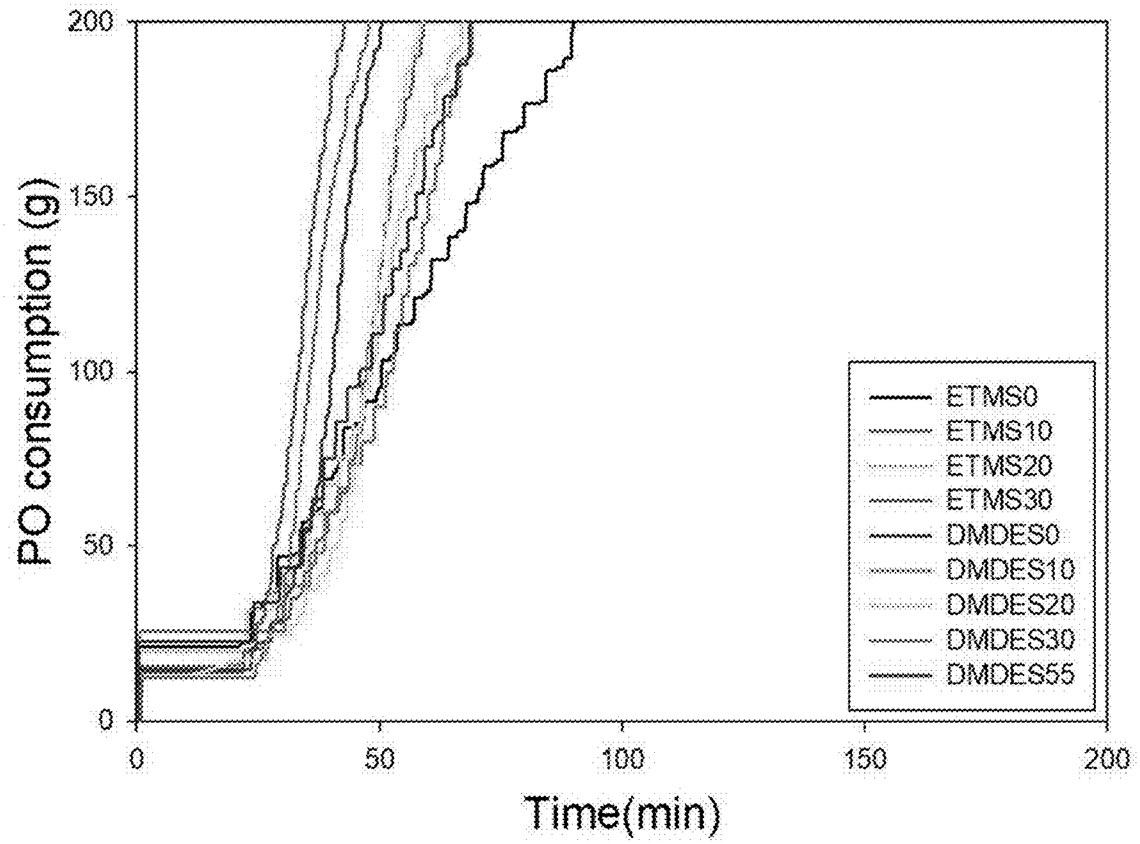
FIG. 17 is a graph showing consumption of PO over time during a polymerization reaction according to each of Present Examples 39 to 47.
Figure 18:
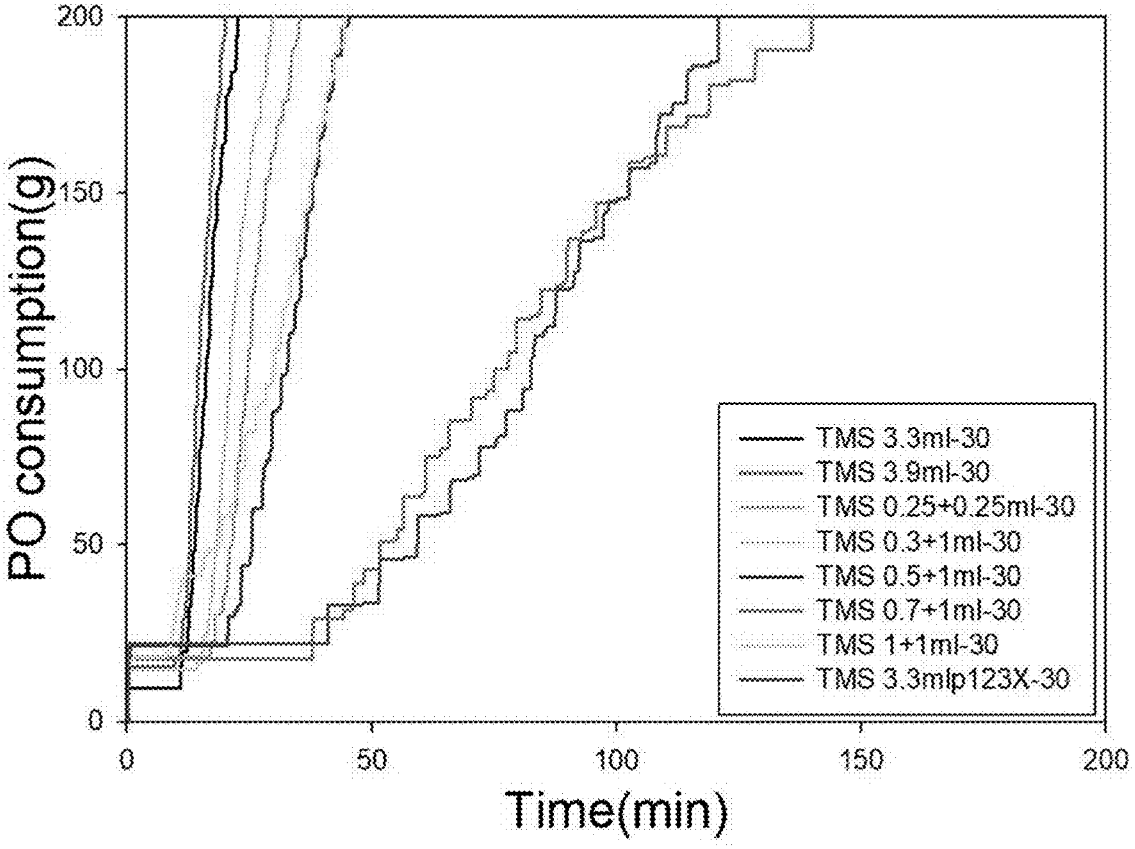
FIG. 18 is a graph showing consumption of PO according to time during a polymerization reaction according to each of Present Examples 48 to 54 and Present Example 72.
Figure 19:
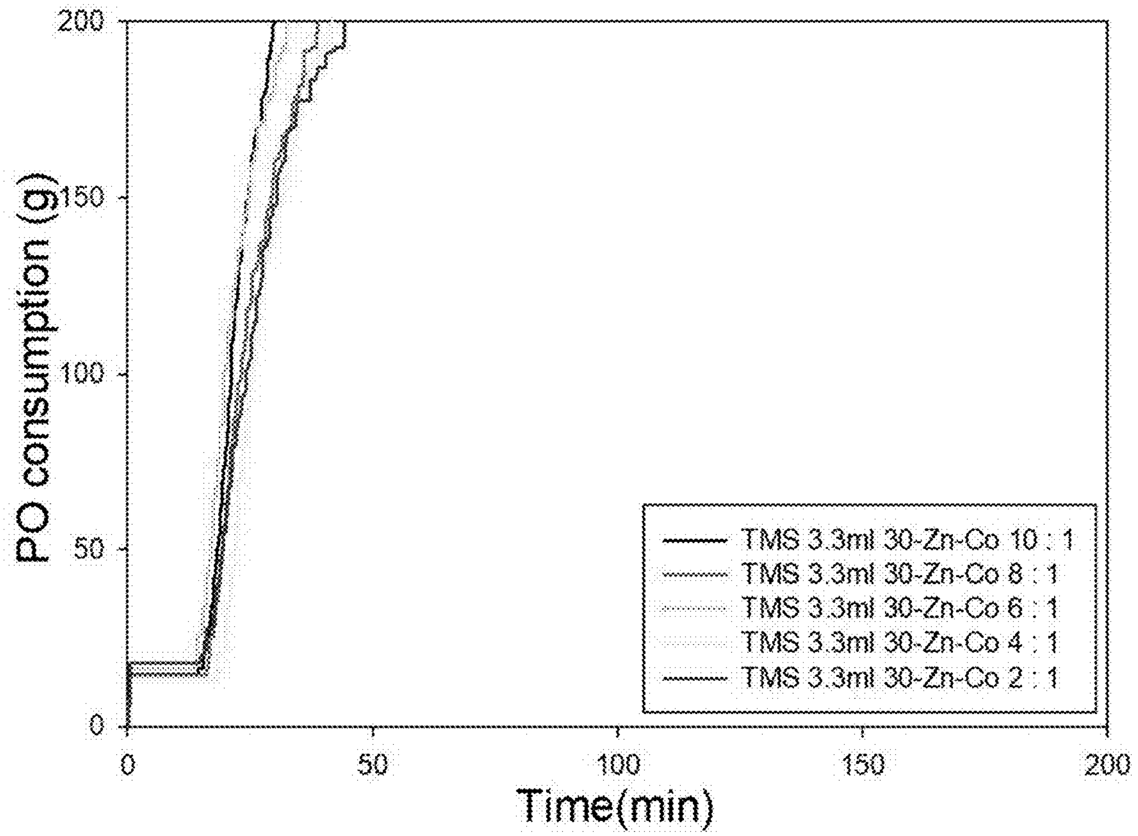
FIG. 19 is a graph showing consumption of PO over time during a polymerization reaction according to each of Present Example 51 and Present Examples 55 to 58.
Figure 20:
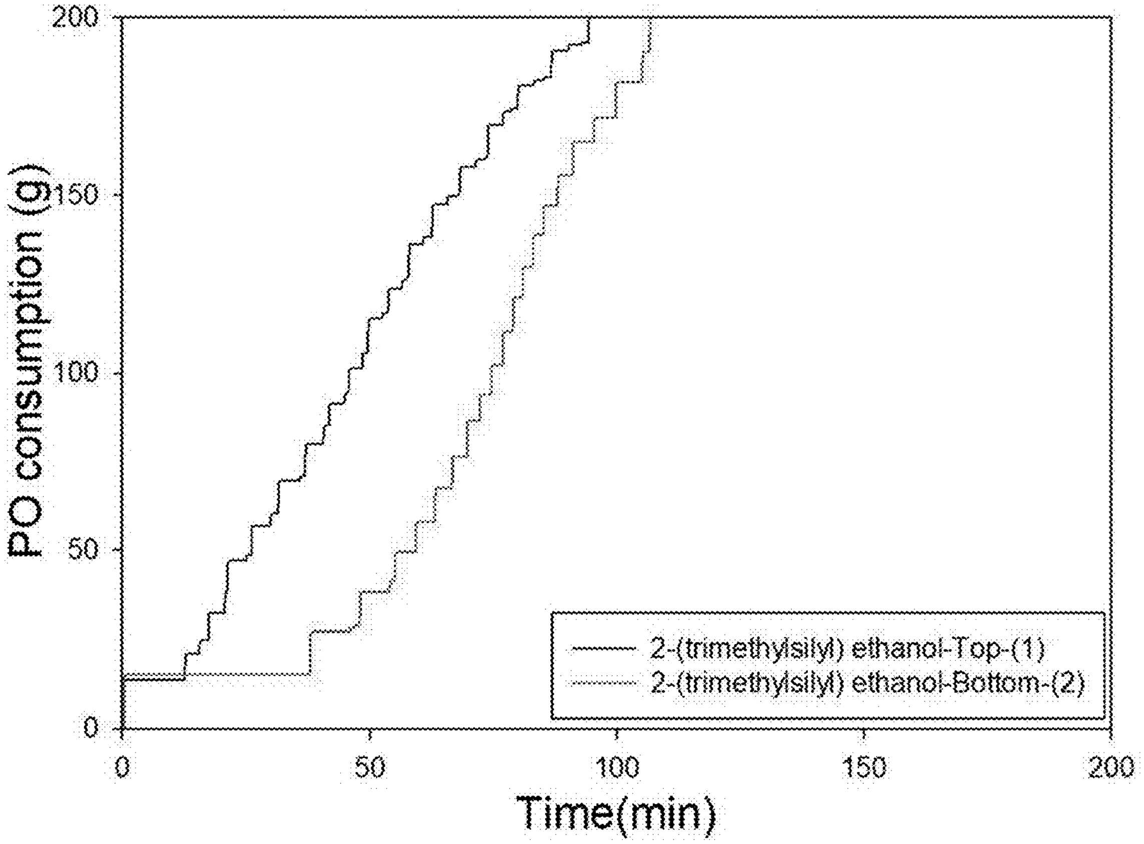
FIG. 20 is a graph showing consumption of PO over time during a polymerization reaction according to each of Present Examples 59-1 and 59-2.
Figure 21:
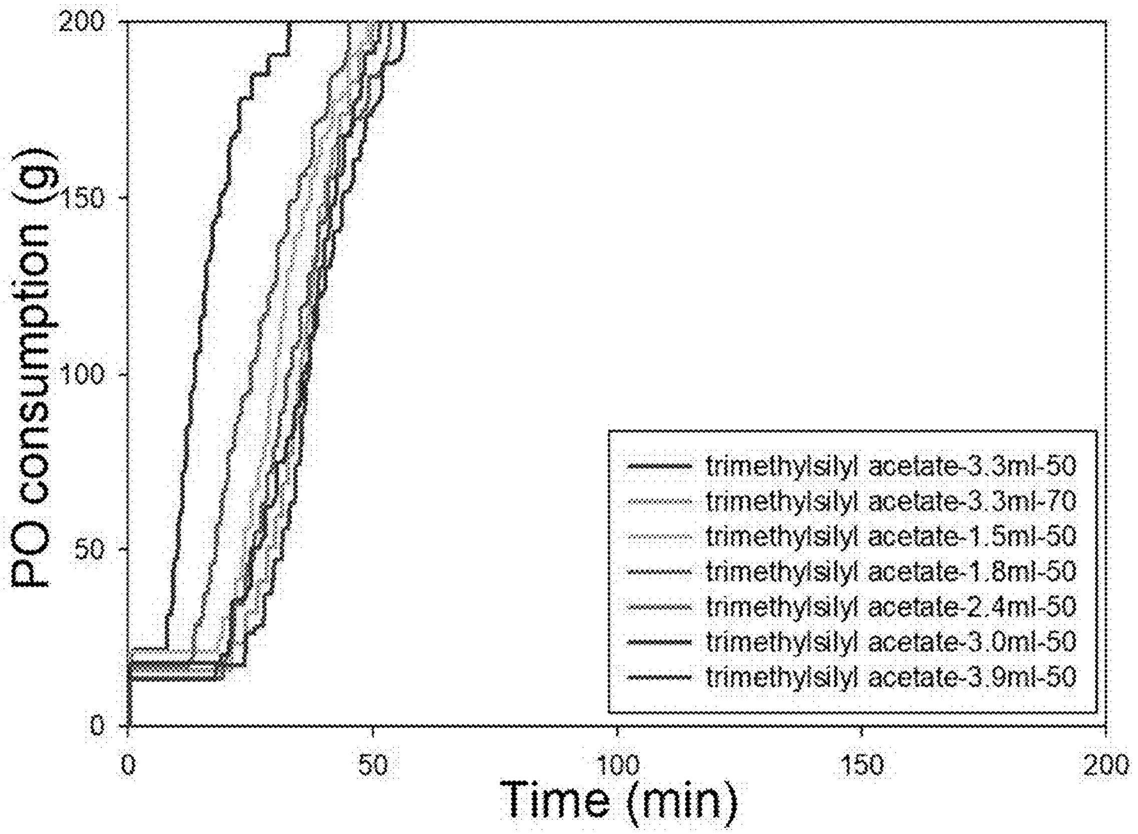
FIG. 21 is a graph showing consumption of PO over time during a polymerization reaction according to each of Present Examples 61 to 67.
Figure 22:
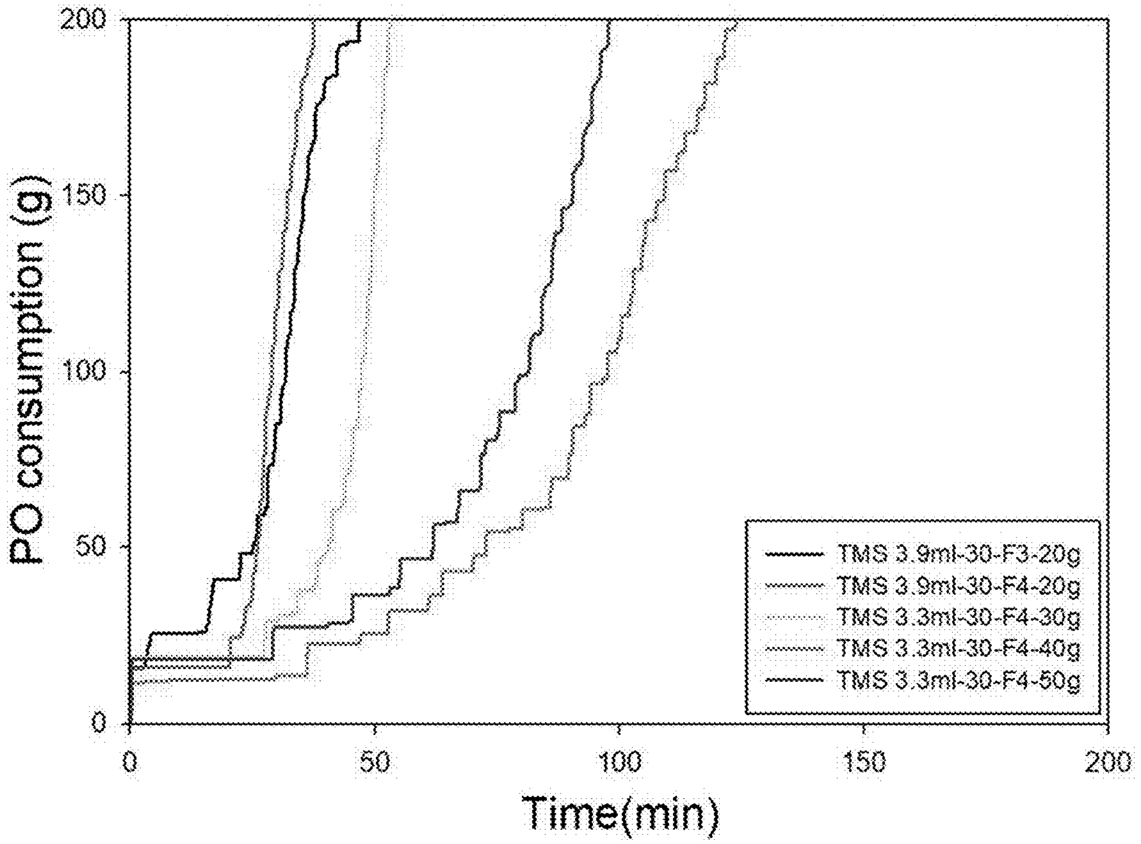
FIG. 22 is a graph showing consumption of PO over time during a polymerization reaction according to each of Present Examples 73 to 74 and Present Examples 79 to 81.
Figure 23:
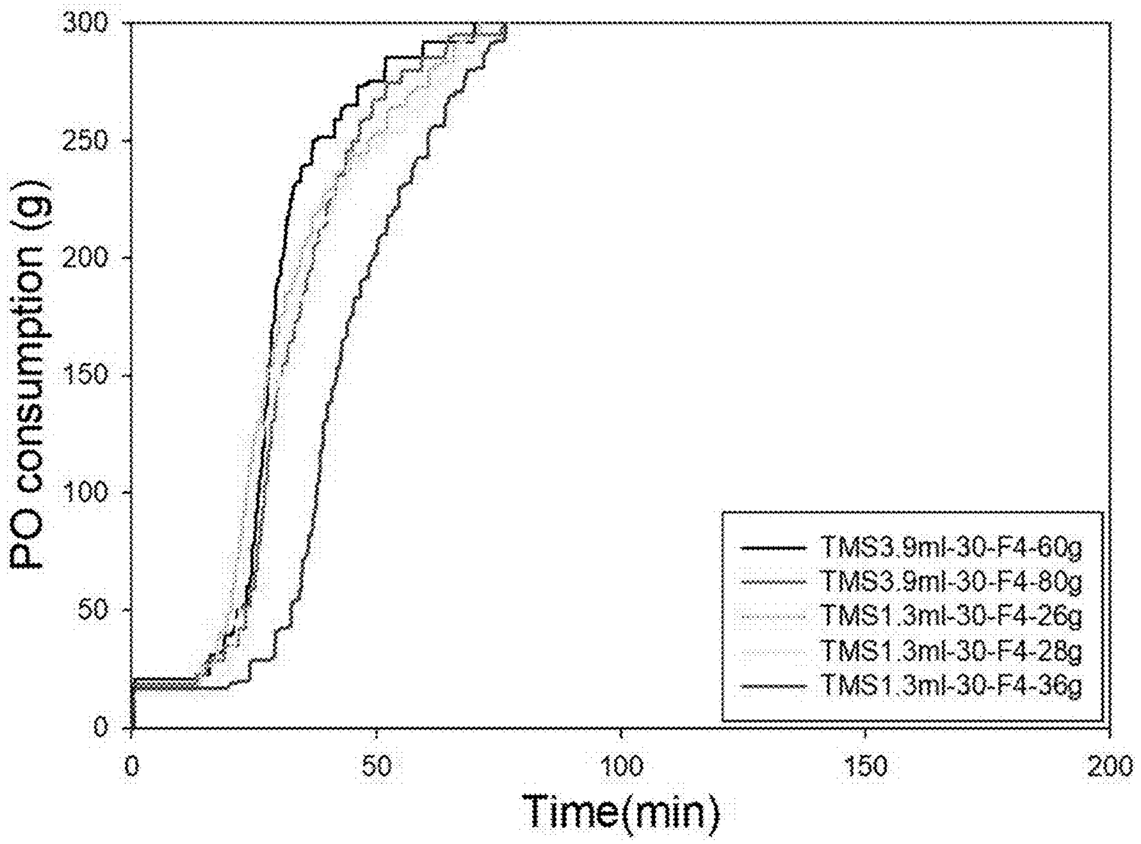
FIG. 23 is a graph showing PO consumption over time during a polymerization reaction according to each of Present Examples 76 to 77, Present Example 83, Present Example 84, and Present Example 86.
Figure 24:
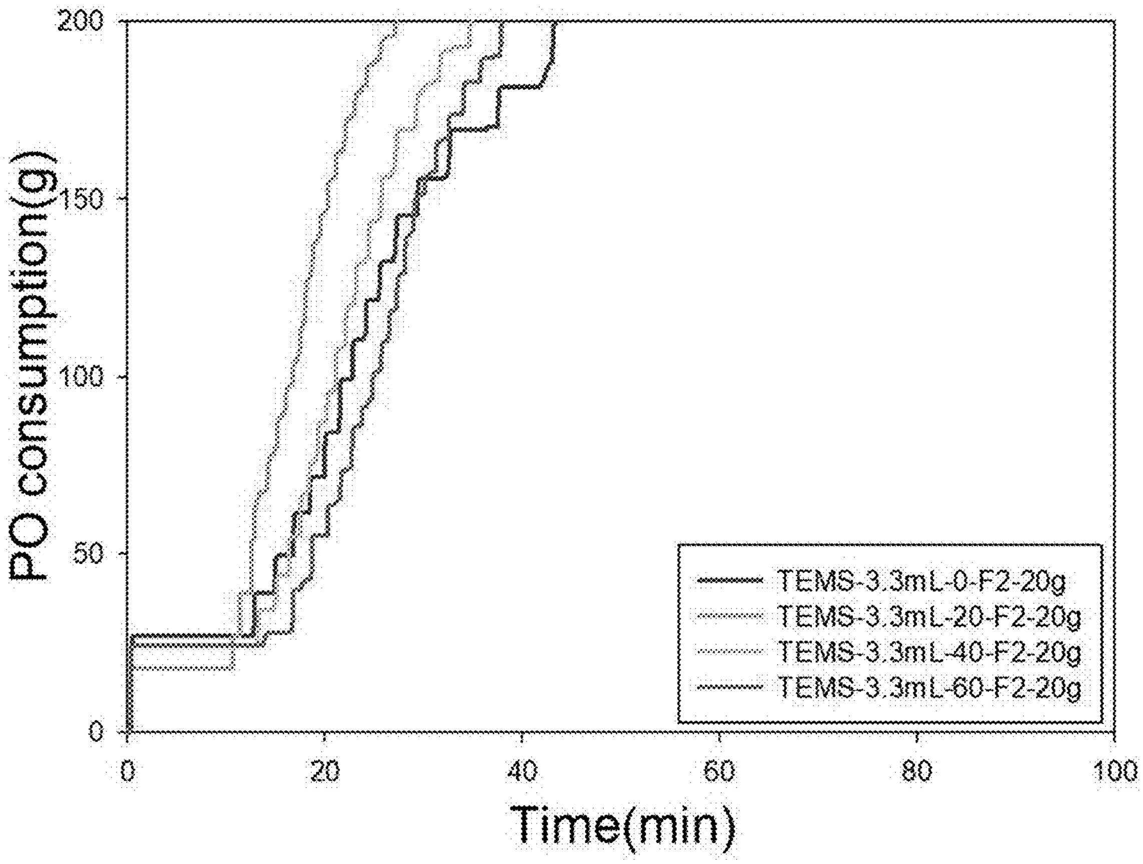
FIG. 24 is a graph showing PO consumption over time during a polymerization reaction according to each of Present Examples 68 to 71.

FIG. 6 to FIG. 7 are diagrams showing a high-resolution image and a component analysis result of a catalyst in accordance with Present Example 4. FIG. 8 to FIG. 9 are diagrams showing a high-resolution image and a component analysis result of a catalyst according to Present Example 7. FIG. 10 to FIG. 11 are diagrams showing a high-resolution image and a component analysis result of a catalyst according to Present Example 10. FIG. 12 is a high-resolution image of a catalyst according to Present Example 11. FIG. 13 to FIG. 14 are diagrams showing a high-resolution image and a component analysis result of a catalyst according to Present Example 13. FIG. 15 to FIG. 16 are diagrams showing a high-resolution image and a component analysis result of a catalyst according to Present Example 34.

Referring to FIGS. 6 to 16, as the complexing agent and the co-complexing agent are introduced into the catalyst matrix according to each of the Present Examples, change in shape from a cubic form of a pure DMC catalyst to a monoclinic plate form was identified.

In particular, referring to FIGS. 15 to 16 related to Present Example 34 that includes only the complexing agent, the concentration of the complexing agent in the catalyst matrix is relatively low and thus particles of the cubic form together with particles of the monoclinic form are observed.

It may be identified from these results that when only the complexing agent according to the Present Example of the present disclosure is used, or when the complexing agent and the co-complexing agent are used together, the resulting catalyst has an amorphous structure with a lower crystallinity than that of Comparative Example 1.

This monoclinic shape means that an area by which the catalyst may contact a monomer and an initiator increases during a polymerization reaction. This means that the catalyst according to Present Example has high activity.

In one example, following Tables 2 to 6 show catalyst surface element analysis results via EDS mapping measurements of Present Example 4, Present Example 7, Present Example 10, Present Example 13, and Present Example 34, respectively.

TABLE 2

| Element (Present Example 4) | Line Type | Apparent Concentration | k Ratio | Wt % | Wt % Sigma | Standard Label | Factory Standard |
|---|---|---|---|---|---|---|---|
| C | K series | 28.57 | 0.28567 | 57.84 | 0.26 | C Vit | Yes |
| N | K series | 13.29 | 0.02366 | 15.23 | 0.30 | BN | Yes |
| O | K series | 5.66 | 0.01906 | 7.37 | 0.11 | $SiO_2$ | Yes |
| Si | K series | 1.16 | 0.00921 | 0.65 | 0.02 | $SiO_2$ | Yes |
| Cl | K series | 3.24 | 0.02827 | 1.85 | 0.02 | NaCl | Yes |
| K | K series | 0.28 | 0.00235 | 0.15 | 0.02 | KBr | Yes |
| Co | K series | 7.64 | 0.07638 | 5.11 | 0.08 | Co | Yes |
| Zn | L series | 10.86 | 0.10859 | 11.81 | 0.09 | Zn | Yes |
| Total: | | | | 100.00 | | | |

TABLE 3

| Element (Present Example 7) | Line Type | Apparent Concentration | k Ratio | Wt % | Wt % Sigma | Standard Label | Factory Standard |
|---|---|---|---|---|---|---|---|
| C | K series | 34.62 | 0.34616 | 58.04 | 0.14 | C Vit | Yes |
| N | K series | 16.39 | 0.02918 | 15.59 | 0.17 | BN | Yes |
| O | K series | 6.14 | 0.02065 | 6.66 | 0.06 | $SiO_2$ | Yes |
| Si | K series | 1.40 | 0.01111 | 0.65 | 0.01 | $SiO_2$ | Yes |
| Cl | K series | 3.97 | 0.03466 | 1.87 | 0.01 | NaCl | Yes |
| K | K series | 0.40 | 0.00339 | 0.18 | 0.01 | KBr | Yes |
| Co | K series | 9.14 | 0.09140 | 5.05 | 0.04 | Co | Yes |
| Zn | L series | 13.35 | 0.13355 | 11.96 | 0.05 | Zn | Yes |
| Total: | | | | 100.00 | | | |

TABLE 4

| Element (Present Example 10) | Line Type | Apparent Concentration | k Ratio | Wt % | Wt % Sigma | Standard Label | Factory Standard |
|---|---|---|---|---|---|---|---|
| C | K series | 72.51 | 0.72508 | 67.88 | 0.12 | C Vit | Yes |
| N | K series | 15.39 | 0.02739 | 13.29 | 0.14 | BN | Yes |
| O | K series | 8.60 | 0.02895 | 7.90 | 0.05 | $SiO_2$ | Yes |
| Si | K series | 1.22 | 0.00964 | 0.43 | 0.01 | $SiO_2$ | Yes |
| Cl | K series | 0.92 | 0.00803 | 0.34 | 0.01 | NaCl | Yes |
| K | K series | 0.94 | 0.00797 | 0.33 | 0.01 | KBr | Yes |
| Co | K series | 7.72 | 0.07722 | 3.46 | 3.46 | Co | Yes |
| Zn | L series | 8.10 | 0.08104 | 5.83 | 5.83 | Zn | Yes |
| Total: | | | | 100.00 | | | |

TABLE 5

| Element (Present Example 13) | Line Type | Apparent Concentration | k Ratio | Wt % | Wt % Sigma | Standard Label | Factory Standard |
|---|---|---|---|---|---|---|---|
| C | K series | 69.90 | 0.69905 | 68.44 | 0.13 | C Vit | Yes |
| N | K series | 14.32 | 0.02550 | 11.99 | 0.14 | BN | Yes |
| O | K series | 9.41 | 0.03166 | 8.15 | 0.05 | $SiO_2$ | Yes |
| Si | K series | 0.81 | 0.00645 | 0.27 | 0.00 | $SiO_2$ | Yes |
| Cl | K series | 3.94 | 0.03444 | 1.40 | 0.01 | NaCl | Yes |
| K | K series | 0.54 | 0.00456 | 0.18 | 0.01 | KBr | Yes |
| Co | K series | 6.26 | 0.06256 | 2.66 | 0.03 | Co | Yes |
| Zn | L series | 9.45 | 0.09453 | 6.34 | 0.03 | Zn | Yes |
| Total: | | | | 100.00 | | | |

TABLE 6

| Element (Present Example 34) | Line Type | Apparent Concentration | k Ratio | Wt % | Wt % Sigma | Standard Label | Factory Standard |
|---|---|---|---|---|---|---|---|
| C | K series | 91.44 | 0.91442 | 66.40 | 0.12 | C Vit | Yes |
| N | K series | 24.86 | 0.04426 | 16.85 | 0.14 | BN | Yes |
| O | K series | 9.13 | 0.03071 | 7.05 | 0.04 | $SiO_2$ | Yes |
| Si | K series | 0.61 | 0.00479 | 0.17 | 0.00 | $SiO_2$ | Yes |
| Cl | K series | 1.58 | 0.00510 | 0.18 | 0.00 | NaCl | Yes |
| K | K series | 0.25 | 0.00209 | 0.07 | 0.00 | KBr | Yes |
| Co | K series | 8.29 | 0.08294 | 3.03 | 0.02 | Co | Yes |
| Zn | L series | 9.79 | 0.09794 | 5.71 | 0.03 | Zn | Yes |
| Total: | | | | 100.00 | | | |

Referring to Tables 2 to 6, an approximate weight mass (wt %) of the constituent material at an exposed surface of the catalyst may be identified.

Preparation of Polyether Polyol

Present Example 39

20 g of polypropylene glycol (PPG) 400 (functional group 2) and 0.1 g of the catalyst according to Present Example 1 were added to the high pressure reactor, and the reactor was purged with nitrogen several times. While stirring was carried out so as to remove water-vapor that may remain in a mixed solution, a temperature of the reactor was raised to 115° C. and the reactor was maintained in a vacuum state for 1 hour.

Subsequently, 15 g of propylene oxide (PO) monomers were input into the reactor. When pressure drop and temperature rise indicating catalyst activation, additional monomers were injected thereto. Specifically, while the pressure was maintained at 0.2 bar, the monomers were injected thereto until 200 g of PO had been consumed.

Thereafter, a vacuum state was maintained for 30 minutes to remove unreacted PO. Thus, polyoxypropylene polyol (Present Example 39) was prepared.

Present Example 40

Polyoxypropylene polyol was prepared in the same manner as that in Present Example 39 except that the catalyst according to Present Example 2 was used instead of the catalyst according to Present Example 1.

Present Example 41

Polyoxypropylene polyol was prepared in the same manner as that in Present Example 39 except that the catalyst according to Present Example 3 was used instead of the catalyst according to Present Example 1.

Present Example 42

Polyoxypropylene polyol was prepared in the same manner as that in Present Example 39 except that the catalyst according to Present Example 4 was used instead of the catalyst according to Present Example 1.

Present Example 43

Polyoxypropylene polyol was prepared in the same manner as that in Present Example 39 except that the catalyst according to Present Example 5 was used instead of the catalyst according to Present Example 1.

Present Example 44

Polyoxypropylene polyol was prepared in the same manner as that in Present Example 39 except that the catalyst according to Present Example 6 was used instead of the catalyst according to Present Example 1.

Present Example 45

Polyoxypropylene polyol was prepared in the same manner as that in Present Example 39 except that the catalyst according to Present Example 7 was used instead of the catalyst according to Present Example 1.

Present Example 46

Polyoxypropylene polyol was prepared in the same manner as that in Present Example 39 except that the catalyst according to Present Example 8 was used instead of the catalyst according to Present Example 1.

Present Example 47

Polyoxypropylene polyol was prepared in the same manner as that in Present Example 39, except that the catalyst according to Present Example 9 was used instead of the catalyst according to Present Example 1.

Present Example 48

Polyoxypropylene polyol was prepared in the same manner as that in Present Example 39 except that the catalyst according to Present Example 10 was used instead of the catalyst according to Present Example 1.

Present Example 49

Polyoxypropylene polyol was prepared in the same manner as that in Present Example 39, except that the catalyst according to Present Example 11 was used instead of the catalyst according to Present Example 1.

Present Example 50

Polyoxypropylene polyol was prepared in the same manner as that in Present Example 39, except that the catalyst according to Present Example 12 was used instead of the catalyst according to Present Example 1.

Present Example 51

Polyoxypropylene polyol was prepared in the same manner as that in Present Example 39 except that the catalyst according to Present Example 13 was used instead of the catalyst according to Present Example 1.

Present Example 52

Polyoxypropylene polyol was prepared in the same manner as that in Present Example 39 except that the catalyst according to Present Example 14 was used instead of the catalyst according to Present Example 1.

Present Example 53

Polyoxypropylene polyol was prepared in the same manner as that in Present Example 39, except that the catalyst according to Present Example 15 was used instead of the catalyst according to Present Example 1.

Present Example 54

Polyoxypropylene polyol was prepared in the same manner as that in Present Example 39 except that the catalyst according to Present Example 16 was used instead of the catalyst according to Present Example 1.

Present Example 55

Polyoxypropylene polyol was prepared in the same manner as that in Present Example 39 except that the catalyst according to Present Example 17 was used instead of the catalyst according to Present Example 1.

Present Example 56

Polyoxypropylene polyol was prepared in the same manner as that in Present Example 39, except that the catalyst according to Present Example 18 was used instead of the catalyst according to Present Example 1.

Present Example 57

Polyoxypropylene polyol was prepared in the same manner as that in Present Example 39 except that the catalyst according to Present Example 19 was used instead of the catalyst according to Present Example 1.

Present Example 58

Polyoxypropylene polyol was prepared in the same manner as that in Present Example 39 except that the catalyst according to Present Example 20 was used instead of the catalyst according to Present Example 1.

Present Example 59

Polyoxypropylene polyol was prepared in the same manner as that in Present Example 39, except that the catalyst according to Present Example 21 was used instead of the catalyst according to Present Example 1.

Present Example 60

Polyoxypropylene polyol was prepared in the same manner as that in Present Example 39, except that the catalyst according to Present Example 22 was used instead of the catalyst according to Present Example 1.

Present Example 61

Polyoxypropylene polyol was prepared in the same manner as that in Present Example 39, except that the catalyst according to Present Example 23 was used instead of the catalyst according to Present Example 1.

Present Example 62

Polyoxypropylene polyol was prepared in the same manner as that in Present Example 39, except that the catalyst according to Present Example 24 was used instead of the catalyst according to Present Example 1.

Present Example 63

Polyoxypropylene polyol was prepared in the same manner as that in Present Example 39, except that the catalyst according to Present Example 25 was used instead of the catalyst according to Present Example 1.

Present Example 64

Polyoxypropylene polyol was prepared in the same manner as that in Present Example 39 except that the catalyst according to Present Example 26 was used instead of the catalyst according to Present Example 1.

Present Example 65

Polyoxypropylene polyol was prepared in the same manner as that in Present Example 39, except that the catalyst according to Present Example 27 was used instead of the catalyst according to Present Example 1.

Present Example 66

Polyoxypropylene polyol was prepared in the same manner as that in Present Example 39, except that the catalyst according to Present Example 28 was used instead of the catalyst according to Present Example 1.

Present Example 67

Polyoxypropylene polyol was prepared in the same manner as that in Present Example 39 except that the catalyst according to Present Example 29 was used instead of the catalyst according to Present Example 1.

Present Example 68

Polyoxypropylene polyol was prepared in the same manner as that in Present Example 39, except that the catalyst according to Present Example 30 was used instead of the catalyst according to Present Example 1.

Present Example 69

Polyoxypropylene polyol was prepared in the same manner as that in Present Example 39 except that the catalyst according to Present Example 31 was used instead of the catalyst according to Present Example 1.

Present Example 70

Polyoxypropylene polyol was prepared in the same manner as that in Present Example 39 except that the catalyst according to Present Example 32 was used instead of the catalyst according to Present Example 1.

Present Example 71

Polyoxypropylene polyol was prepared in the same manner as that in Present Example 39 except that the catalyst according to Present Example 33 was used instead of the catalyst according to Present Example 1.

Present Example 72

Polyoxypropylene polyol was prepared in the same manner as that in Present Example 39, except that the catalyst according to Present Example 34 was used instead of the catalyst according to Present Example 1.

Present Example 73

20 g of polypropylene glycol (PPG) 450 (functional group 3) and 0.1 g of the catalyst according to Present Example 11 were added to the high pressure reactor, and the reactor was purged with nitrogen several times. While stirring was carried out so as to remove water-vapor that may remain in a mixed solution, a temperature of the reactor was raised to 115° C. and the reactor was maintained in a vacuum state for 1 hour.

Subsequently, 15 g of propylene oxide (PO) monomers were input into the reactor. When pressure drop and temperature rise indicating catalyst activation, additional monomers were injected thereto. Specifically, while the pressure was maintained at 0.2 bar, the monomers were injected thereto until 200 g of PO had been consumed.

Thereafter, a vacuum state was maintained for 30 minutes to remove unreacted PO. Thus, polyoxypropylene polyol (Present Example 73) was prepared.

Present Example 74

Polyoxypropylene polyol was prepared in the same manner as that in Present Example 73, except that 20 g of polypropylene glycol (PPG) 978 (functional group 4) was used instead of polypropylene glycol (PPG) 450 (functional group 3).

Present Example 75

45 g of polypropylene glycol (PPG) 978 (functional group 3) and 0.15 g of the catalyst according to Present Example 11 were added to the high pressure reactor, and the reactor was purged with nitrogen several times. While stirring was carried out so as to remove water-vapor that may remain in a mixed solution, a temperature of the reactor was raised to 115° C. and the reactor was maintained in a vacuum state for 1 hour.

Subsequently, 15 g of propylene oxide (PO) monomers were input into the reactor. When pressure drop and temperature rise indicating catalyst activation, additional monomers were injected thereto. Specifically, while the pressure was maintained at 0.2 bar, the monomers were injected thereto until 300 g of PO had been consumed.

Thereafter, a vacuum state was maintained for 30 minutes to remove unreacted PO. Thus, polyoxypropylene polyol (Present Example 75) was prepared.

Present Example 76

Polyoxypropylene polyol was prepared in the same manner as that in Present Example 75, except that 60 g of polypropylene glycol (PPG) 978 (functional group 4) was used.

Present Example 77

Polyoxypropylene polyol was prepared in the same manner as that in Present Example 75, except that 80 g of polypropylene glycol (PPG) 978 (functional group 4) was used.

Present Example 78

Polyoxypropylene polyol was prepared in the same manner as that in Present Example 75 except that 90 g of polypropylene glycol (PPG) 978 (functional group 4) was used.

Present Example 79

30 g of polypropylene glycol (PPG) 978 (functional group 4) and 0.1 g of the catalyst according to Present Example 10 were added to the high pressure reactor, and the reactor was purged with nitrogen several times. While stirring was carried out so as to remove water-vapor that may remain in a mixed solution, a temperature of the reactor was raised to 115° C. and the reactor was maintained in a vacuum state for 1 hour.

Subsequently, 15 g of propylene oxide (PO) monomers were input into the reactor. When pressure drop and temperature rise indicating catalyst activation, additional monomers were injected thereto. Specifically, while the pressure was maintained at 0.2 bar, the monomers were injected thereto until 200 g of PO had been consumed.

Thereafter, a vacuum state was maintained for 30 minutes to remove unreacted PO. Thus, polyoxypropylene polyol (Present Example 79) was prepared.

Present Example 80

Polyoxypropylene polyol was prepared in the same manner as that in Present Example 79, except that 40 g of polypropylene glycol (PPG) 978 (functional group 4) was used.

Present Example 81

Polyoxypropylene polyol was prepared in the same manner as that in Present Example 79, except that 50 g of polypropylene glycol (PPG) 978 (functional group 4) was used.

Present Example 82

25 g of polypropylene glycol (PPG) 978 (functional group 4) and 0.15 g of the catalyst according to Present Example 13 were added to the high pressure reactor, and the reactor was purged with nitrogen several times. While stirring was carried out so as to remove water-vapor that may remain in a mixed solution, a temperature of the reactor was raised to 115° C. and the reactor was maintained in a vacuum state for 1 hour.

Subsequently, 15 g of propylene oxide (PO) monomers were input into the reactor. When pressure drop and temperature rise indicating catalyst activation, additional monomers were injected thereto. Specifically, while the pressure was maintained at 0.2 bar, the monomers were injected thereto until 300 g of PO had been consumed.

Thereafter, a vacuum state was maintained for 30 minutes to remove unreacted PO. Thus, polyoxypropylene polyol (Present Example 82) was prepared.

Present Example 83

Polyoxypropylene polyol was prepared in the same manner as that in Present Example 82, except that 26 g of polypropylene glycol (PPG) 978 (functional group 4) was used.

Present Example 84

Polyoxypropylene polyol was prepared in the same manner as that in Present Example 82, except that 28 g of polypropylene glycol (PPG) 978 (functional group 4) was used.

Present Example 85

Polyoxypropylene polyol was prepared in the same manner as that in Present Example 82, except that 30 g of polypropylene glycol (PPG) 978 (functional group 4) was used.

Present Example 86

Polyoxypropylene polyol was prepared in the same manner as that in Present Example 82, except that 36 g of polypropylene glycol (PPG) 978 (functional group 4) was used.

Present Example 87

Polyoxypropylene polyol was prepared in the same manner as that in Present Example 82, except that 30 g of polypropylene glycol (PPG) 978 (functional group 4) was used and 375 g of PO was injected to the reactor.

Preparation of Polycarbonate Polyol

Present Example 88

Carbon dioxide was injected into the reactor at a pressure of 10 bar or higher, and then the catalyst of Present Example 10, 1 mL of 50 mg polypropylene glycol (PPG) 978 (functional group 4) and 10 mL of toluene were added to the reactor. Then, the reactor was purged for 30 minutes under a pressure of approximately 30 bar. Thereafter, the reactor was heated to 105° C. for 50 minutes to remove an initiator and moisture in the reactor as much as possible.

Thereafter, the temperature of the reactor was lowered to 30° C. or lower. A trace amount of carbon dioxide gas, and 20 mL of propylene oxide (PO) were added to the reactor, and then a vent line and an inlet were closed.

The reactor was heated to 105° C., and carbon dioxide gas was injected to the reactor to increase a carbon dioxide pressure in the reactor to 30 bar. When the temperature and pressure were stabilized, stirring was started and polymerization was carried out for 3 hours.

After 3 hours, the injection of carbon dioxide gas and the heating were terminated. Then, residual carbon dioxide gas in the reactor was removed. The reactor was removed, and a product was obtained.

The product was diluted with chloroform, and passed through a filter paper to remove the catalyst therefrom. Unreacted reactants and by-products were removed in a purification process using chloroform and distilled water. Chloroform and toluene as the solvents were removed using a rotary evaporator for 2 hours to obtain polycarbonate polyol (Present Example 88).

Present Example 89

Polycarbonate polyol was prepared in the same manner as that in Present Example 88, except that the catalyst according to Present Example 11 was used instead of the catalyst according to Present Example 10.

FIGS. 17 to 24 are graphs showing consumption of PO over time during the polymerization reaction using the catalysts according to Present Examples of the present disclosure, respectively.

A following Table 7 shows physical properties and polymerization results of polyoxypropylene polyols prepared according to Present Examples 39 to 87.

Figure 25:
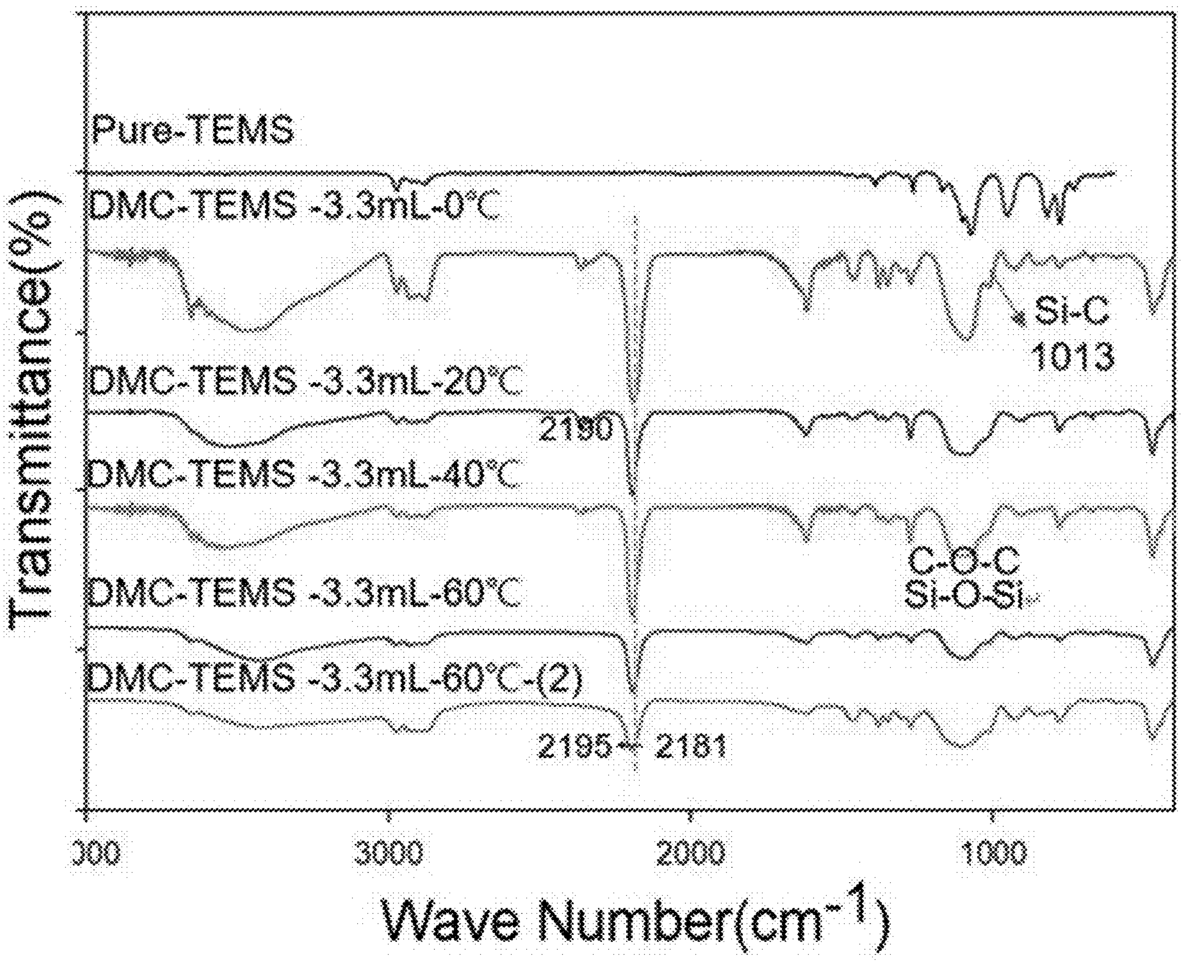
FIG. 25 is a schematic diagram of peaks of constituent elements of polyol in accordance with each of Present Examples 68 to 71 as measured using an infrared spectroscopy.

FIG. 25 is a schematic diagram of peaks of catalyst constituent elements of polyol in accordance each of Present Examples 68 to 71 using infrared spectroscopy. Based on a C≡N peak in a 2190 wave number ($cm^{-1}$), a Si—O—Si peak and a C—O—C peak in a 1100 wave number ($cm^{-1}$) and a Si—C peak in a 1013 wave number ($cm^{-1}$) tend to increase as the temperature increases. Thus, it may be predicted that as the temperature increases, the complexing agent MTES is present in a condensed form in the catalyst matrix and donates electrons thereto.

TABLE 7

| Present Example | Catalyst (Present Example) | Molecular Weight (Mn) | PDI | Hydroxyl group value (mgBu4OH/g) | Number of functional groups | Induction time (min) | Maximum polymerization rate (g POP/g-Cat h) | Viscosity (cp) | Unsaturation ($meq*g^{-1}$)h |
|---|---|---|---|---|---|---|---|---|---|
| 39 | ETMS 3.3 mL-0° C. (Present Example 1) | 4700 | 1.35 | 33.92 | 2.8 | 23 | 1664 | 856 | 0.0088 |
| 40 | ETMS 3.3 mL-10° C. (Present Example 2) | 4800 | 1.31 | 90.2 | 2.59 | 21 | 3065 | 829 | 0.0084 |
| 41 | ETMS 3.3 mL-20° C. (Present Example 3) | 4900 | 1.33 | 91.4 | 2.64 | 22 | 2481 | 871 | 0.0079 |
| 42 | ETMS 3.3 mL-30° C. (Present Example 4) | 4700 | 1.31 | 28.59 | 2.41 | 19 | 5181 | 824 | 0.0083 |
| 43 | DMDES 3.3 mL-0° C. (Present Example 5) | 5300 | 1.19 | 33.3 | 2.6 | 23 | 4111 | 823 | 0.0088 |
| 44 | DMDES 3.3 mL-10° C. (Present Example 6) | 3100 | 1.36 | 36.97 | 2.96 | 30 | 2861 | 843 | 0.0108 |
| 45 | DMDES 3.3 mL-20° C. (Present Example 7) | 4500 | 1.34 | 32.4 | 2.6 | 26 | 3488 | 791 | 0.0109 |
| 46 | DMDES 3.3 mL-30° C. (Present Example 8) | 4500 | 1.33 | 31.87 | 2.56 | 24 | 5285 | 788 | 0.0106 |
| 47 | DMDES 3.3 mL-55° C. (Present Example 9) | 4000 | 1.48 | 33.92 | 2.8 | 24 | 2414 | 777 | 0.0112 |
| 48 | TMS 3.3 mL-30° C. (Present Example 10) | 4600 | 1.31 | 32.86 | 2.69 | 11 | 10309 | 776 | 0.0082 |
| 49 | TMS 3.9 mL-30° C. (Present Example 11) | 4200 | 1.33 | 35.62 | 2.67 | 11.8 | 11800 | 825 | 0.0088 |
| 50 | TMS 0.25 + 0.25 mL-30° C. (Present Example 12) | 4900 | 1.26 | 32.26 | 2.52 | 18 | 8318 | 756 | 0.0072 |

TABLE 7-continued

| Present Example | Catalyst (Present Example) | Molecular Weight (Mn) | PDI | Hydroxyl group value (mgBu4OH/g) | Number of functional groups | Induction time (min) | Maximum polymerization rate (g POP/g-Cat h) | Viscosity (cp) | Unsaturation (meq*g$^{-1}$)h |
|---|---|---|---|---|---|---|---|---|---|
| 51 | TMS 0.3 + 1 mL-30° C. (Present Example 13) | 4500 | 1.29 | 33.26 | 2.39 | 15 | 7926 | 745 | 0.0073 |
| 52 | TMS 0.5 + 1 mL-30° C. (Present Example 14) | 4700 | 1.29 | 33.36 | 2.52 | 20 | 4617 | 756 | 0.0081 |
| 53 | TMS 0.7 + 1 mL-30° C. (Present Example 15) | 4800 | 1.35 | 31.68 | 2.43 | 38 | 1065 | 844 | 0.0102 |
| 54 | TMS 1 + 1 mL-30° C. (Present Example 16) | 4600 | 1.26 | 33.23 | 2.41 | 19 | 4224 | 748 | 0.0088 |
| 55 | TMS 0.3 + 1 mL-30° C.-Zn—Co 8:1 (Present Example 17) | 5600 | 1.30 | 28.31 | 2.52 | 16 | 4991 5073 | 1086 | 0.0082 |
| 56 | TMS 0.3 + 1 mL-30° C.-Zn—Co 6:1 (Present Example 18) | 5300 | 1.30 | 29.20 | 2.47 | 14 | 6200 | 930 | 0.0078 |
| 57 | TMS 0.3 + 1 mL-30° C.-Zn—Co 4:1 (Present Example 19) | 5500 | 1.30 | 28.81 | 2.52 | 19 | 5811 | 1068 | 0.0090 |
| 58 | TMS 0.3 + 1 mL-30° C.-Zn—Co 2:1 (Present Example 20) | 5900 | 1.38 | 27.29 | 2.59 | 15 | 3848 | 1269 | 0.0116 |
| 59-(1) | TMSEtOH 3.3 mL-30° C.-Top (Present Example 21) | 5100 | 1.39 | 27.65 | 2.39 | 17 | 1415 | 1048 | 0.0108 |
| 59-(2) | TMSEtOH 3.3 mL-30° C.-Bottom (Present Example 21) | 4960 | 1.39 | 27.88 | 2.34 | 38 | 1635 | 1103 | 0.0097 |
| 61 | TMSAc 3.3 ml-50° C. (Present Example 23) | 6300 | 1.21 | 27 | 2.89 | 7 | 4416 | 1026 | 0.0081 |
| 62 | TMSAc 3.3 ml-70° C. (Present Example 24) | 5300 | 1.30 | 28.6 | 2.55 | 21 | 3964 | 895 | 0.0088 |
| 63 | TMSAc 1.5 ml-50° C. (Present Example 25) | 5600 | 1.20 | 29.73 | 2.83 | 19 | 3700 | 863 | 0.0066 |
| 64 | TMSAc 1.8 ml-50° C. (Present Example 26) | 5000 | 1.25 | 30.21 | 2.56 | 21 | 3488 | 981 | 0.0063 |
| 65 | TMSAc 2.4 ml-50° C. (Present Example 27) | 5230 | 1.20 | 28.3 | 2.51 | 13 | 3450 | 929 | 0.0065 |
| 66 | TMSAc 3.0 ml-50° C. (Present Example 28) | 5150 | 1.20 | 28.5 | 2.62 | 21 | 3154 | 901 | 0.0073 |
| 67 | TMSAc 3.9 ml-50° C. (Present Example 29) | 5900 | 1.18 | 28.47 | 2.86 | 24 | 4200 | 980 | 0.0068 |

TABLE 7-continued

| Present Example | Catalyst (Present Example) | Molecular Weight (Mn) | PDI | Hydroxyl group value (mgBu4OH/g) | Number of functional groups | Induction time (min) | Maximum polymerization rate (g POP/g-Cat h) | Viscosity (cp) | Unsaturation (meq*g$^{-1}$)h |
|---|---|---|---|---|---|---|---|---|---|
| 68 | TEMS 3.3 ml-0° C. (Present Example 30) | 6070 | 1.18 | 23.65 | 2.64 | 12 | 3440 | 754 | 0.0096 |
| 69 | TEMS 3.3 ml-20° C. (Present Example 31) | 3520 | 1.19 | 38.6 | 2.42 | 12 | 8169 | 795 | 0.0108 |
| 70 | TEMS 3.3 ml-40° C. (Present Example 32) | 3730 | 1.12 | 38.81 | 2.58 | 13 | 5000 | 780 | 0.0104 |
| 71 | TEMS 3.3 ml-60° C. (Present Example 33) | 3990 | 1.17 | 35.98 | 2.56 | 16 | 5114 | 751 | 0.0094 |
| 72 | TMS 3.3 mL-P123X-30° C. (Present Example 34) | 4500 | 1.39 | 35.17 | 2.49 | 40 | 1350 | 776 | 0.0124 |
| 73 | TMS 3.9 mL-30° C. (Present Example 11) | 5200 | 1.32 | 81.43 | 3 (7.19) | 22 | 4450 | 789 | |
| 74 | TMS 3.9 mL-30° C. (Present Example 11) | 5400 | 1.38 | 50.67 | 4.34 | 20 | 6388 | 813 | |
| 75 | TMS 3.9 mL-30° C. (Present Example 11) | 4500 | 1.38 | 66.20 | 4.59 | 14 | 1677 | 710 | |
| 76 | TMS 3.9 mL-30° C. (Present Example 11) | 3300 | 1.37 | 80.38 | 4.05 | 15 | 1971 | 594 | |
| 77 | TMS 3.9 mL-30° C. (Present Example 11) | 2600 | 1.36 | 100.91 | 3.74 | 17 | 1677 | 542 | |
| 78 | TMS 3.9 mL-30° C. (Present Example 11) | 2300 | 1.36 | 109.53 | 3.56 | 21 | 1310 | 530 | |
| 79 | TMS 3.3 mL-30° C. (Present Example 10) | 4100 | 1.33 | 70.90 | 4.38 | 27 | 4200 | 669 | |
| 80 | TMS 3.3 mL-30° C. (Present Example 10) | 3400 | 1.36 | 85.32 | 4.35 | 36 | 1228 | 601 | |
| 81 | TMS 3.3 mL-30° C. (Present Example 10) | 2800 | 1.36 | 97.30 | 3.85 | 29 | 1677 | 572 | |
| 82 | TMS 0.3 + 1 mL-30° C. (Present Example 13) | 8600 | 1.30 | 34.09 | 5.02 | 17 | 1327 | 1235 | |
| 83 | TMS 0.3 + 1 mL-30° C. (Present Example 13) | 8000 | 1.32 | 36.20 | 4.75 | 17 | 1327 | 941 | |
| 84 | TMS 0.3 + 1 mL-30° C. (Present Example 13) | 7000 | 1.43 | 38.56 | 4.46 | 20 | 1958 | 1175 | |
| 85 | TMS 0.3 + 1 mL-30° C. (Present Example 13) | 6500 | 1.43 | 43.12 | 4.54 | 25 | 2516 | 627 | |

TABLE 7-continued

| Present Example | Catalyst (Present Example) | Molecular Weight (Mn) | PDI | Hydroxyl group value (mgBu4OH/g) | Number of functional groups | Induction time (min) | Maximum polymerization rate (g POP/g-Cat h) | Viscosity (cp) | Unsaturation (meq*g$^{-1}$)h |
|---|---|---|---|---|---|---|---|---|---|
| 86 | TMS 0.3 + 1 mL-30° C. (Present Example 13) | 5600 | 1.40 | 46.02 | 4.02 | 23 | 2185 | 822 | |
| 87 | TMS 0.3 + 1 mL-30° C. (Present Example 13) | 8600 | 1.30 | 34.71 | 4.94 | 17 | 570 | 1183 | |

Referring to Table 7, in the polyol preparation according to each of Present Examples 39 to 87 of the present disclosure, propylene oxide (PO) was used as a monomer, each of PPG 400 (functional group 2), PPG 450 (functional group 3), and PPG 978 (functional group 4) was used as an initiator, and the number of functional groups was indicated based on a measuring result of the hydroxyl value according to ASTM E 1899-97. Further, regarding the viscosity, an average value of values measured a total of three times using a Brookfield DV-11+por Viscometer was calculated. The molecular weight (Mn) and the molecular weight distribution (PDI) of the polyol were measured using gel permeation chromatography (GPC).

As shown in FIGS. 17 to 24 and Table 7, the induction time was in a range from several minutes to several tens of minutes. In a desirable catalyst, the maximum polymerization reaction rate was also very high, that is, is equal to or higher than 10000. Thus, the deactivation was suppressed.

In particular, it may be identified that in Present Example 49 and Present Example 48 using the catalysts in accordance with Present Example 10 and Present Example 11 using a silane compound containing a hydroxyl group (—OH), respectively, the induction time is very short, that is, 11 minutes, and the maximum polymerization reaction rate has a very high value of 10000 or higher, and the activity is also maintained. This indicates that the catalyst in accordance with each of Present Example 10 and Present Example 11 using a silane compound containing a hydroxyl group (—OH) is the most desirable catalyst.

Further, it may be identified that in Present Example 42 using the catalyst in accordance with Present Example 4 using a silane compound containing one alkoxy group (—OR), in Present Example 69 using a catalyst in accordance with Present Example 31 using a silane compound containing three alkoxy groups (—OR), etc. short induction time, high polymerization reaction rate, and suppression of deactivation are achieved. This indicates that the catalyst in accordance with each of Present Example 4 and Present Example 31 exhibit desirable catalyst activity. All of these catalysts were synthesized at a temperature below 40° C.

Further, it may be identified that Present Example 8 using a silane compound containing two alkoxy groups (—OR), and Present Examples using trimethylsilyl acetate also exhibit a relatively short induction time, high polymerization reaction rate, and suppression of deactivation, and thus good catalyst activity.

On the contrary, when Comparative Examples 35 to 38 using a silane compound containing four alkoxy groups (—OR) were used, polyol was not synthesized. Thus, it may be identified that the catalysts of Comparative Examples have strong attraction with the metal active site, so that the monomer does not coordinate with the active site, and the silane compound as the complexing agent does not act to donate electrons to the metal ions due to self-condensation polymerization reaction between the complexing agents. Therefore, the organosilane compound as the complexing agent according to the present disclosure preferably includes 1 to 3 alkoxy groups (—OR), or includes one hydroxyl group (—OH).

In one example, it may be identified referring to Present Examples 68 to 71 using the catalysts of Present Examples 30 to 33 using a silane compound containing three alkoxy groups (—OR), respectively that a polyol synthesis time gradually increases (Present Example 69→Present Example 71) as a temperature during catalyst preparation increases from 20° C. (Present Example 31) to 60° C. (Present Example 33). Thus, it may be identified from these results that when the catalyst using the silane compound containing three alkoxy groups (—OR) is prepared, it is preferable that the preparation is carried out at a temperature of 60° C. or lower (most preferable, at 20° C.). It may be predicted that when preparing the catalyst at a temperature exceeding 60° C., a relatively undesirable catalyst may be prepared due to decrease of an amount of a complexing agent that donates the electrons to the metal ions due to the self-condensation reaction between the complexing agents.

Further, the functional groups of polyols based on the functional groups of the initiators of the catalysts are different from each other. Therefore, it may be identified that the functional group of the polyol thus obtained may be controlled by adjusting the functional group of the initiator.

In one example, a following Table 8 shows physical properties and polymerization results of polycarbonate polyols prepared using the catalysts of Present Example 10 and Present Example 11, respectively.

TABLE 8

| | | GPC | | $^{1}$H-NMR | | | | |
|---|---|---|---|---|---|---|---|---|
| Present Example | Catalyst (Present Example) | Molecular Weight (Mn) | PDI | Molecular Weight (Mn) | Carbonate selectivity (%) | Carbonate content (wt %) | Hydroxyl group value (mgBu4OH/g) | Number of functional groups |
| 88 | TMS 3.3 mL-30° C. (Present Example 10) | 4550 | 2.98 | 5450 | 34.4 | 9.85 | 43.66 | 4.24 |

TABLE 8-continued

| | | GPC | | ¹H-NMR | | | | |
|---|---|---|---|---|---|---|---|---|
| Present Example | Catalyst (Present Example) | Molecular Weight (Mn) | PDI | Molecular Weight (Mn) | Carbonate selectivity (%) | Carbonate content (wt %) | Hydroxyl group value (mgBu4OH/g) | Number of functional groups |
| 89 | TMS 3.9 mL-30° C. (Present Example 11) | 4500 | 2.35 | 4820 | 17.2 | 11.7 | 45.49 | 3.91 |

In the preparation of the polycarbonate polyol of Table 8, propylene oxide was used as a monomer, toluene was used as a solvent, and PPG 978 (functional group 4) was used as an initiator, and the number of functional groups was measured based on a measuring result of the hydroxyl value according to ASTM E 1899-97. Further, the molecular weight (Mn) and the molecular weight distribution (PDI) of polyol were measured using gel permeation chromatography (GPC). The molecular weight, the carbonate selectivity and the content of the carbonate were measured using $^{1}$H-NMR spectroscopy (200 MHz Spectrometer, Varian).

Specifically, in $^{1}$H-NMR spectroscopic analysis, a carbonate peak appears at around 4.8 to 5.1 ppm, a carbonate ether peak appears at 4.3 to 3.85, and an ether peak appears at around 3.85 to 3.2 ppm, and a peak of the initiator appears at around 3.1 to 3.2 ppm. These results were used to calculate the molecular weight, the carbonate selectivity, and the carbonate content based on following Equations 1 to 3, respectively. The calculation results are shown in Table 8.

Molecular weight=[(initiator molecular weight)+(carbonate peak area integral value/3*102)+(ether peak area integral value-21)/3*58] Equation 1

Carbonate selectivity=[FCO2*polyol molecular weight/(polyol molecular weight-initiator molecular weight)]*100 Equation 2

(where, FCO2=[carbonate peak area integral value/(carbonate peak area integral value+ether peak area integral value)]

Carbonate Content=carbonate peak area integral/(carbonate peak area integral value+carbonate ether peak area integral value) Equation 3

Referring to Table 8, it may be identified that the functional group of the resulting polyol may be controlled by adjusting the functional group of the initiator. Further, it may be identified that the prepared catalysts have narrower PDIs and high hydroxyl group values, compared to those of conventional catalysts.

Although the present disclosure has been described above with reference to the preferred Examples, those skilled in the art will understand that various modifications and changes may be made to the present disclosure without departing from the spirit and scope of the present disclosure set forth in a following claims.

What is claimed is:

1. A double-metal cyanide catalyst for preparing polyether-based polyols by ring-opening polymerization of an epoxy compound, the catalyst comprising:

(a) a metal salt represented by Chemical Formula 6:

$M(X)_n$, [Chemical Formula 6]

wherein M represents one selected from zinc (II), iron (II), iron (III), nickel (II), manganese (II), cobalt (II), tin (II), lead (II), molybdenum (IV), molybdenum (VI), aluminum (III), vanadium (V), vanadium (IV), strontium (II), tungsten (IV), tungsten (VI), copper (II) and chromium (III), wherein X represents one selected from halide, hydroxide, sulfate, carbonate, cyanide, oxalate, thiocyanate, isocyanate, isothiocyanate, carboxylate and nitrate, and wherein n is an integer from 1 to 3;

(b) a metal cyanide represented by Chemical Formula 7:

$(Y)_aM'(CN)_b$, wherein Y represents an alkali or alkaline metal, [Chemical Formula 7]

wherein M' represents one selected from iron (II), iron (III), cobalt (II), cobalt (III), chromium (II), chromium (III), manganese (II), manganese (III), iridium (III), nickel (II), rhodium (III), ruthenium (II), vanadium (V), and vanadium (IV), wherein each of a and b is an integer greater than or equal to 1, and wherein a sum of charges of a and b is equal to a charge of M'; and (c) complexing agents represented by Chemical Formula 5:

[Chemical Formula 5]

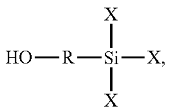

wherein R represents *-$C_nH_{2n}$-*, wherein n is an integer from 0 to 8, and wherein X represents one selected from an alkyl group having 1 to 8 carbon atoms, a methyl group, an ethyl group, an isobutyl group, a phenyl group, a vinyl group, a cyclophenyl group, and a cyclohexyl group, wherein the complexing agent is an organosilane compound.

2. The double-metal cyanide catalyst of claim 1, wherein the double-metal cyanide catalyst further comprises a co-complexing agent.

3. The double-metal cyanide catalyst of claim 2, wherein the co-complexing agent includes at least one selected from polypropylene glycol, polyethylene glycol, polytetrahydrofuran, poly(oxyethylene-block-propylene) copolymer, poly(oxyethylene-block-tetrahydrofuran) copolymer, poly(oxypropylene-block)-tetrahydrofuran) copolymer, and poly(oxyethylene-block-oxypropylene-block-oxyethylene) copolymer.

4. The double-metal cyanide catalyst of claim 3, wherein a weight ratio of the complexing agent to the co-complexing agent is in a range of 1 to 10:1.

5. A method for preparing a double-metal cyanide catalyst for preparing polyether-based polyols by ring-opening polymerization of an epoxy compound, the method comprising:

preparing a first solution including an organosilane-based complexing agent represented by Chemical Formula 5:

[Chemical formula 5]

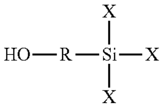

wherein R represents *-$C_nH_{2n}$-* (n is an integer from 0 to 8), and wherein X represents one selected from an alkyl group having 1 to 8 carbon atoms, a methyl group, an ethyl group, an isobutyl group, a phenyl group, a vinyl group, a cyclophenyl group, and a cyclohexyl group;

a metal salt represented by Chemical Formula 6:

$M(X)_n$ [Chemical Formula 6]

wherein M represents one selected from zinc (II), iron (II), iron (III), nickel (II), manganese (II), cobalt (II), tin (II), lead (II), molybdenum (IV), molybdenum (VI), aluminum (III), vanadium (V), vanadium (IV), strontium (II), tungsten (IV), tungsten (VI), copper (II) and chromium (III), wherein X represents one selected from halide, hydroxide, sulfate, carbonate, cyanide, oxalate, thiocyanate, isocyanate, isothiocyanate, carboxylate and nitrate, and wherein n is an integer from 1 to 3; and distilled water;

preparing a second solution including metal cyanide represented by Chemical Formula 7:

$(Y)_aM'(CN)_b$, wherein Y represents an alkali or alkaline metal, [Chemical Formula 7]

wherein M' represents one selected from iron (II), iron (III), cobalt (II), cobalt (III), chromium (II), chromium (III), manganese (II), manganese (III), iridium (III), nickel (II), rhodium (III), ruthenium (II), vanadium (V), and vanadium (IV), wherein each of a and b is an integer greater than or equal to 1, and wherein a sum of charges of a and b is equal to a charge of M'; and distilled water; and a first step of mixing the first solution and the second solution with each other to produce a mixed solution.

6. The method of claim 5, wherein the method further comprises preparing a third solution including an organosilane-based complexing agent represented by Chemical Formula 5 and a co-complexing agent, wherein the method further includes, after the first step, a second step of mixing the third solution to the mixed solution of the first step.

7. The method of claim 6, wherein the method further comprises, after the second step, a third step of mixing distilled water and an organosilane-based complexing agent represented by Chemical Formula 5 with the mixed solution prepared in the second step, wherein the method further comprises, after the third step, a fourth step of combining the third solution to the mixed solution prepared in the third step.

8. The method of claim 5, wherein the mixing is carried out at a temperature of 0 to 60° C.

9. A method for preparing polyol, the method comprising copolymerizing polypropylene glycol and an epoxy compound under presence of the double-metal cyanide catalyst according to claim 1.

10. The method of claim 9, wherein the epoxy compound includes at least one selected from compounds of following chemical formulas:

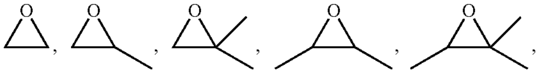

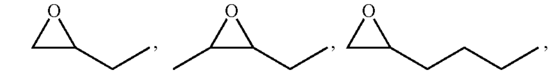

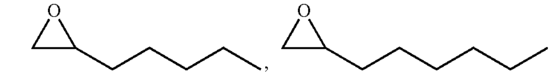

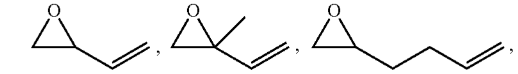

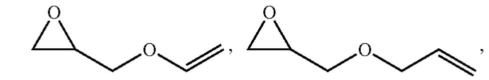

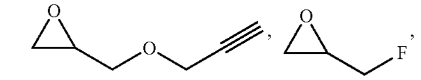

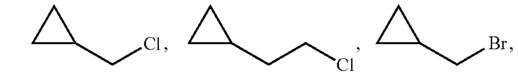

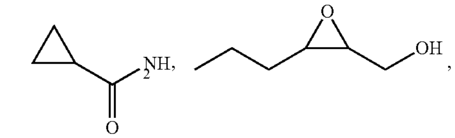

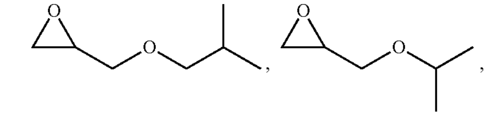

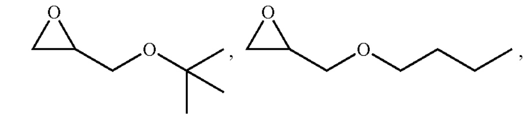

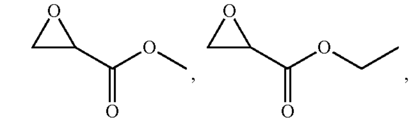

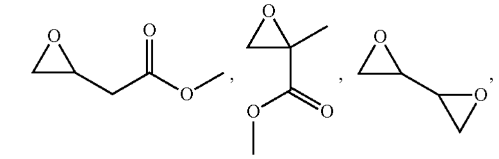

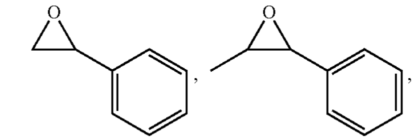

-continued
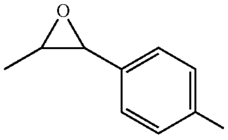 , 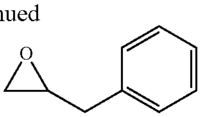 ,
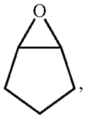 , 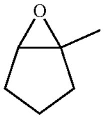 , 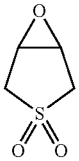 , 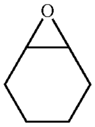 , 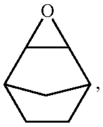 ,
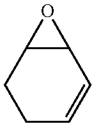 , 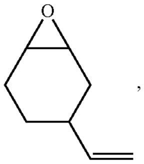 , 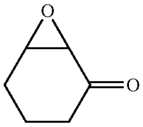 , 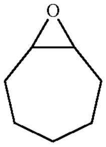 ,
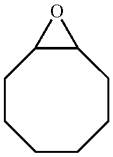 , 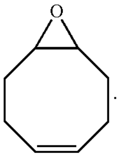 .
* * * * *